(12) United States Patent
Evans et al.

(10) Patent No.: US 7,116,310 B1
(45) Date of Patent: *Oct. 3, 2006

(54) APPLICATION PROGRAMMING INTERFACE THAT MAPS INPUT DEVICE CONTROLS TO SOFTWARE ACTIONS

(75) Inventors: C. Shane Evans, Kirkland, WA (US); Marcus J. Andrews, Redmond, WA (US); Om K. Sharma, Kirkland, WA (US); James E. Veres, Woodinville, WA (US); John M. Thornton, Duvall, WA (US)

(73) Assignee: Microsoft Corporation, Redmond, WA (US)

(*) Notice: Subject to any disclaimer, the term of this patent is extended or adjusted under 35 U.S.C. 154(b) by 0 days.

This patent is subject to a terminal disclaimer.

(21) Appl. No.: 09/855,274

(22) Filed: May 14, 2001

Related U.S. Application Data

(63) Continuation of application No. 09/483,113, filed on Jan. 10, 2000, now Pat. No. 6,727,884, and a continuation of application No. 09/497,914, filed on Feb. 4, 2000, now Pat. No. 6,965,368.

(60) Provisional application No. 60/204,154, filed on May 15, 2000, provisional application No. 60/127,972, filed on Apr. 6, 1999.

(51) Int. Cl.
*G09G 5/00* (2006.01)
*A63F 9/24* (2006.01)

(52) U.S. Cl. .................... 345/156; 345/169; 463/36; 463/37

(58) Field of Classification Search ........ 345/156–179; 463/25, 36–38; 713/201; 710/10, 8, 19, 710/62–72; 395/882, 275
See application file for complete search history.

(56) References Cited

U.S. PATENT DOCUMENTS

| 4,976,435 A | | 12/1990 | Shatford |
| 5,157,384 A | * | 10/1992 | Geanias et al. ............. 340/706 |
| 5,317,695 A | * | 5/1994 | Celi, Jr. ..................... 395/275 |

(Continued)

FOREIGN PATENT DOCUMENTS

EP 0 394 614 10/1990

(Continued)

OTHER PUBLICATIONS

Universal Serial Bus Specification, Revision 1.1, Sep. 23, 1998, pp. ii, 4, 6, and 19.*

(Continued)

*Primary Examiner*—Bipin Shalwala
*Assistant Examiner*—David L. Lewis
(74) *Attorney, Agent, or Firm*—Klarquist Sparkman, LLP

(57) ABSTRACT

A system for using computer input devices with software applications is disclosed. The system includes an input device mapper API, which uses a language of semantics as an interface between input devices and software applications. The input device mapper receives information about which semantics the devices connected to the computer are able to implement, and which semantics correspond to actions that a user can request the software to perform. The input device mapper maps controls on the available devices into user-requestable software actions by matching, as closely as possible, device controls and software actions that correspond to the same semantic. The system thus makes input devices and software applications transparent to each other, and permits a software application to be designed to operate without regard to which input device is being used to control its actions.

30 Claims, 15 Drawing Sheets

U.S. PATENT DOCUMENTS

| | | |
|---|---|---|
| 5,396,267 A | 3/1995 | Bouton |
| 5,442,376 A * | 8/1995 | Tannenbaum et al. ...... 345/156 |
| 5,807,175 A * | 9/1998 | Davis et al. ................. 463/36 |
| 5,838,307 A | 11/1998 | Bouton ....................... 345/168 |
| 5,893,064 A | 4/1999 | Kudirka et al. |
| 5,896,125 A | 4/1999 | Niedzwiecki |
| 5,935,224 A * | 8/1999 | Svancarek et al. ............ 463/36 |
| 5,977,886 A * | 11/1999 | Barile et al. ................ 345/168 |
| 5,991,546 A * | 11/1999 | Chan et al. ................. 395/882 |
| 6,071,194 A | 6/2000 | Sanderson et al. |
| 6,073,205 A | 6/2000 | Thomson |
| 6,081,855 A * | 6/2000 | deCarmo ..................... 710/62 |
| 6,085,265 A | 7/2000 | Kou |
| 6,192,420 B1 * | 2/2001 | Tsai et al. ..................... 710/10 |
| 6,195,712 B1 | 2/2001 | Pawlowski et al. |
| 6,213,880 B1 * | 4/2001 | Sim ............................. 463/37 |
| 6,223,289 B1 * | 4/2001 | Wall et al. .................. 713/201 |
| 6,263,392 B1 * | 7/2001 | McCauley ................... 463/25 |
| 6,311,228 B1 | 10/2001 | Ray |
| 6,349,345 B1 * | 2/2002 | Sims et al. .................... 710/8 |
| 6,615,299 B1 * | 9/2003 | Chu et al. ..................... 710/65 |
| 6,643,721 B1 * | 11/2003 | Sun .............................. 710/62 |

FOREIGN PATENT DOCUMENTS

| | | |
|---|---|---|
| GB | 2 241 474 | 9/1991 |
| WO | WO 98/57719 A | 12/1998 |

OTHER PUBLICATIONS

Apple Computer, Inc., *Apple Game Sprockets Guide*, Ch. 3, pp. 3/5-3/68 (84 total pages), 1996.

Compaq, Intel, Microsoft, and NEC, *Universal Serial Bus Specification*, Revision 1.1, Chapter 4 (Architectural Overview), Chapter 6 (Mechanical), and Chapter 9 (USB Device Framework), Sep. 23, 1998, 62 pages.

Systemsoft Corporation and Intel Corporation, *Universal Serial Bus Common Class Specification*, Revision 1.0, Dec. 16, 1997, 16 pages.

USB Implementers' Forum, *Universal Serial Bus (USB). Device Class Definition for Human Interface Devices (HID)*, Version 1.11, 1996-2001, 96 pages.

\* cited by examiner

Figure 4

A-S Correlation 231

| ACTION IN APPLICATION 36a | SEMANTIC |
|---|---|
| turn left or right | STEER |
| speed up | ACCELERATE |
| slow down | DECELERATE |
| change to next higher gear | SHIFT UP |
| fire machine guns | FIRE |
| change dash display | DASHBOARD |
| feedback | RUMBLE |
| ... | ... |

Figure 3

C-S Correlation 221

| CONTROL ON DEVICE 66 | SEMANTIC |
|---|---|
| Trigger 1 | FIRE |
| Button 1 | SHIFT UP |
| Steering Wheel | STEER |
| Right Pedal | ACCELERATE |
| Left Pedal | DECELERATE |
| Button 2 | TALK |
| Vibrate | RUMBLE |
| ... | ... |

Figure 12
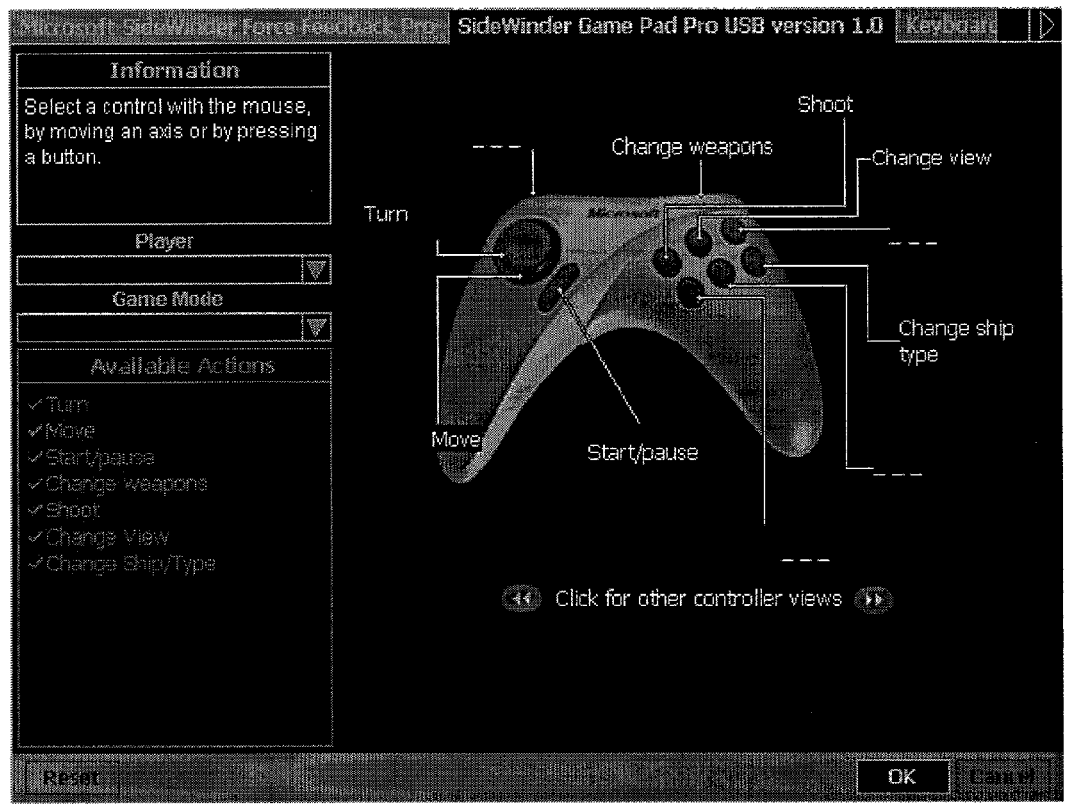
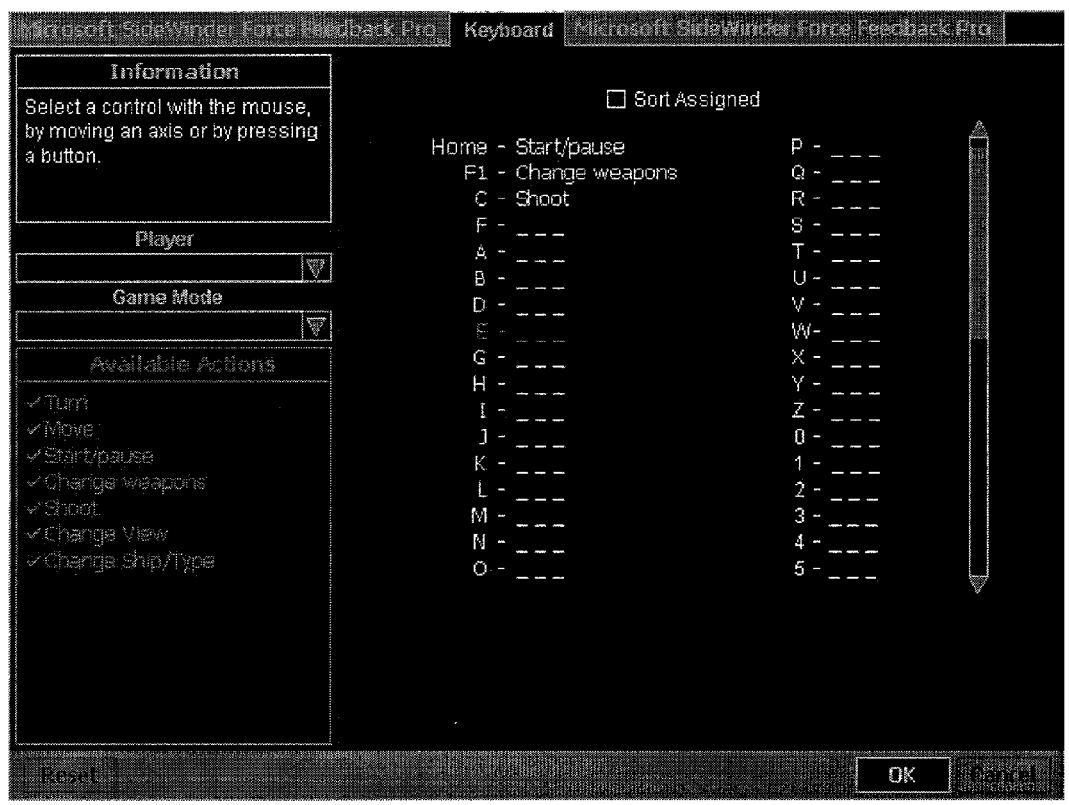

ENUMDEVICESBYSEMANTICS

APPLICATION PROGRAMMING INTERFACE THAT MAPS INPUT DEVICE CONTROLS TO SOFTWARE ACTIONS

CROSS-REFERENCE TO RELATED APPLICATIONS

This application is a continuation of U.S. application Ser. No. 09/483,113, filed Jan. 10, 2000 (now U.S. Pat. No. 6,727,884), which claims benefit to U.S. Provisional Application No. 60/127,972, filed Apr. 6, 1999. This application is also a continuation of U.S. application Ser. No. 09/497,914, filed Feb. 4, 2000 now U.S. Pat. No. 6,965,368, which is a continuation-in-part of U.S. application Ser. No. 09/483,113, filed Jan. 10, 2000 (now U.S. Pat. No. 6,727,884), which claims benefit to U.S. Provisional Application No. 60/127,972, filed Apr. 6, 1999. This application also claims benefit to U.S. Provisional Application No. 60/204,154, filed May 15, 2000.

TECHNICAL FIELD

This invention relates generally to the field of computer systems, and, more particularly, to the use of input devices with software applications.

BACKGROUND

Various input devices are available to permit a computer user to communicate with a computer. A typical personal computer offers input devices such as a keyboard and a mouse. Numerous other devices are available, such as drawing pads, joysticks, and steering wheels (for use with driving games). These devices can be connected to a computer, and they permit the user to communicate information to the computer; the information communicated instructs software applications running on the computer to perform specified actions. Ideally, a computer user would be able to load a software application, connect an appropriate device to the computer, and the device and software would work together naturally. This ideal, however, has not been realized in prior systems.

In order for a device to work with a given software application, there must be a defined relationship between the controls on the device and actions that the software performs, but there are few standards governing the way in which this relationship is defined. Traditionally, software developers design software applications to support the most common devices and provide a device mapping control panel for those users who own other devices. This approach, however, has drawbacks: A software developer who wants to design an application to work well with many devices must know what controls are available on each device (e.g., buttons, levers, etc.) and how the device notifies the computer system of operational events (e.g., an input of 1001 signifies the pressing of a button). Additionally, the software developer must make design decisions as to which devices the software will support, and, on those devices that will be supported, how the controls will map to the actions that the software performs, which is a labor-intensive process for the software developer. Moreover, if a user owns an unsupported device, the user must generally resort to mapping the unsupported device manually by referring to generic pictures and tables in an application's manual and using the device mapping control panel provided with the application, which is a notoriously difficult process.

Some input device manufacturers address the problem of ensuring that specific applications work well with the device by supplying a software component with the device that dynamically reconfigures the device based on guesses as to what actions the application expects the device to support. Some manufacturers of devices with newer features provide filters to accommodate existing applications; frequently, these filters simulate keyboard presses or mouse movements for games that do not recognize enhanced features of the new device. Alternatively, some devices are supplied with mapping software that detects the presence of certain applications on the system and configures the device to work better with those applications. These ad hoc approaches, however, are error prone, may result in a relationship between device controls and software actions that feels unnatural to the user, and can only provide support for applications the device manufacturer knows about and chooses to support.

In view of the foregoing, there is a need for a system that overcomes the drawbacks of the prior art.

SUMMARY

The system of the present invention includes a Mapper Application Program Interface (API), which links controls on input devices with actions that a software application performs. The Mapper API uses vocabularies of semantics, called "genres," where the semantics in each genre are appropriate for a particular category of applications, such as driving games or flight simulation games. For each input device, a correlation is made between the device's controls and semantics selected from a genre. Also, for each software application, a correlation is provided between the application's actions and semantics selected from a genre. The Mapper API creates a mapping between device controls and software actions by identifying an input device that supports the software's genre and by connecting, as closely as possible, each control on the device with a software action that is correlated with the same semantic.

Game applications exemplify the system's use. For example, there may be a "driving game" genre. Each semantic in the driving game genre represents an abstract action that a driving game may be able to perform, such as "steer," "accelerate," and "decelerate." A steering wheel device may correlate the "steer" semantic with turning the steering wheel, and the "accelerate" and "decelerate" semantics with the right and left pedals. A driving game application may correlate the "steer," "accelerate," and "brake" semantics with the game actions of turning, speeding up, and slowing down, respectively. The Mapper API maps each device control into the game action associated with the same semantic. The Mapper API uses these correlations to map device controls into software actions; for example, the steering wheel maps to the action of turning the car, and the right and left pedals map to the actions of speeding up and slowing down the car.

The system may include several genres, where the different genres are appropriate for different types of applications. For example, in addition to the driving game genre described above, there could be a flight-simulation genre and a computer-aided design (CAD) genre. Devices may specify which genres they work well with and may provide a correlation between their controls and the semantics from each such genre. An application, on the other hand, can specify which genre the application falls into, or may specify various genres, representing different contexts within the application. For example, a game may start out in a driving game genre while a character drives to the location of a mission; later, the game may switch to a first-person fighter genre for when the character gets out of the car and moves around fighting targets.

The mapping created may be used by an input device manager, which translates notification of device events (such as the pressing of a button on a joystick) into the application's input dialect while the application executes. Alternatively, the Mapper API may provide the mapping directly to the application, which then receives event notifications directly from the various input devices and uses the mapping to perform a particular action upon receiving notification of a corresponding device event, as specified in the mapping.

The Mapper API has several methods that can be used by the application program. For example, EnumDevicesBySemantics enumerates installed input devices on the system according to the genre specified by the application. Additionally, BuildActionMap creates the mapping for actions to controls for a selected device. SetActionMap sets an action map to the selected device, and saves the map for future use if settings have been changed.

Other features of the invention are described below.

BRIEF DESCRIPTION OF THE DRAWINGS

The foregoing summary, as well as the following detailed description, is better understood when read in conjunction with the appended drawings. For the purpose of illustrating the invention, there is shown in the drawings exemplary constructions of the invention; however, the invention is not limited to the specific methods and instrumentalities disclosed. In the drawings:

FIG. 3 is a block diagram showing a sample control-semantic correlation and its structure.

FIG. 4 is a block diagram showing a sample action-semantic correlation and its structure.

FIG. 12 is an exemplary illustration of a user interface (UI) used with the present invention.

DETAILED DESCRIPTION

Overview

The variety of software applications and input devices available gives consumers increasingly large choices as to the applications and devices to use with a computer. This variety comes at the expense of compatibility, as not all applications and devices are configured to work together. Ideally, a computer user should be able to load an application, such as a game, connect an appropriate input device, and have the application and device work together in a manner that feels natural to the user, thus allowing true "plug and play" capability.

Computer Environment

Figure 1:
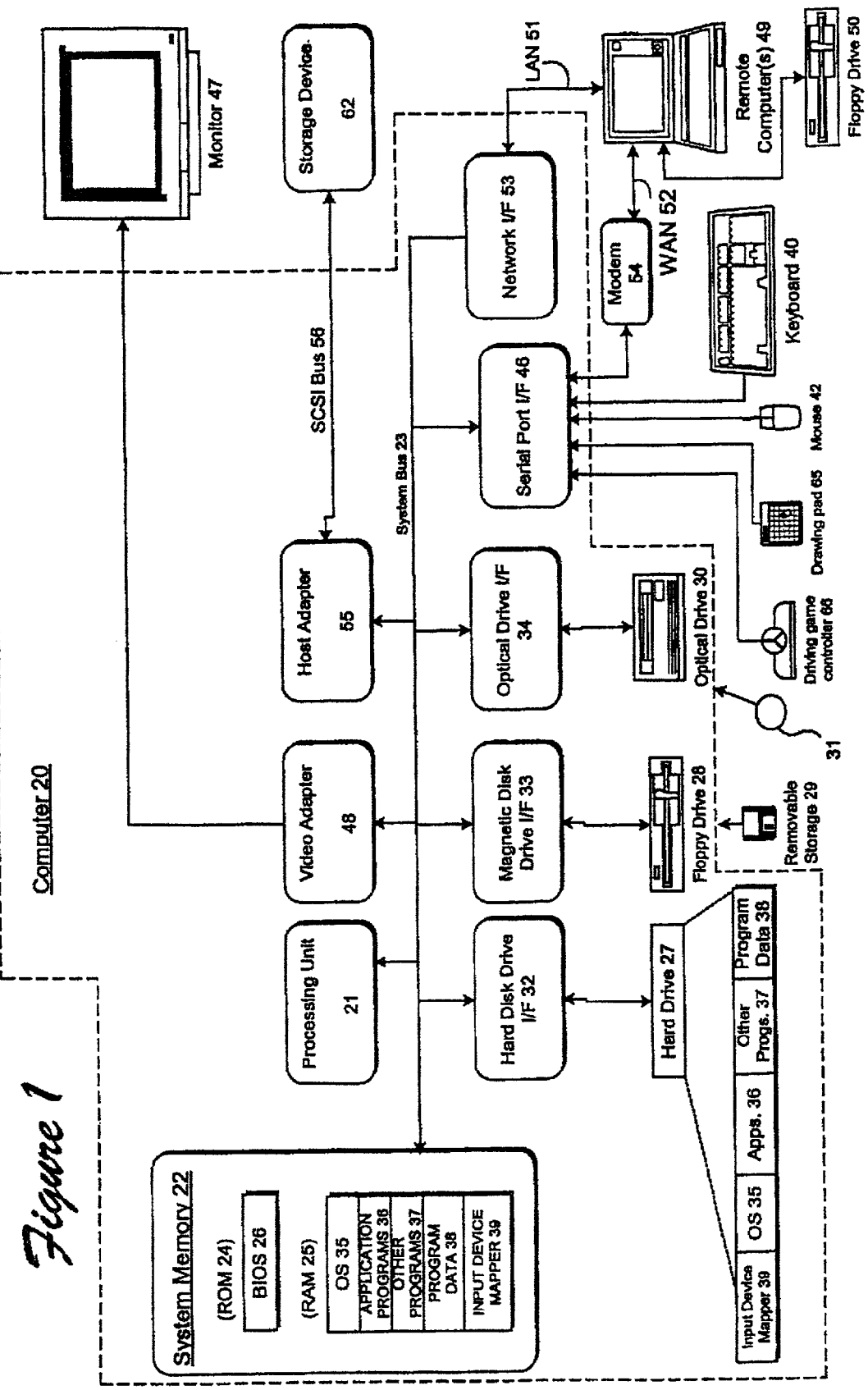
FIG. 1 is a block diagram representing a computer system in which aspects of the invention may be incorporated.

FIG. 1 and the following discussion are intended to provide a brief general description of a suitable computing environment in which the invention may be implemented. Although not required, the invention will be described in the general context of computer-executable instructions, such as program modules, being executed by a computer, such as a client workstation or a server. Generally, program modules include routines, programs, objects, components, data structures and the like that perform particular tasks or implement particular abstract data types. Moreover, those skilled in the art will appreciate that the invention may be practiced with other computer system configurations, including hand-held devices, multi-processor systems, microprocessor-based or programmable consumer electronics, network PCs, minicomputers, mainframe computers and the like. The invention may also be practiced in distributed computing environments where tasks are performed by remote processing devices that are linked through a communications network. In a distributed computing environment, program modules may be located in both local and remote memory storage devices.

As shown in FIG. 1, an exemplary system for implementing the invention includes a general purpose computing device in the form of a conventional personal computer 20 or the like, including a processing unit 21, a system memory 22, and a system bus 23 that couples various system components including the system memory to the processing unit 21. The system bus 23 may be any of several types of bus structures including a memory bus or memory controller, a peripheral bus, and a local bus using any of a variety of bus architectures. The system memory includes read-only memory (ROM) 24 and random access memory (RAM) 25. A basic input/output system 26 (BIOS), containing the basic routines that help to transfer information between elements within the personal computer 20, such as during start-up, is stored in ROM 24. The personal computer 20 may further include a hard disk drive 27 for reading from and writing to a hard disk, not shown, a magnetic disk drive 28 for reading from or writing to a removable magnetic disk 29, and an optical disk drive 30 for reading from or writing to a removable optical disk 31 such as a CD-ROM or other optical media. The hard disk drive 27, magnetic disk drive 28, and optical disk drive 30 are connected to the system bus 23 by a hard disk drive interface 32, a magnetic disk drive interface 33, and an optical drive interface 34, respectively. The drives and their associated computer-readable media provide non-volatile storage of computer readable instructions, data structures, program modules and other data for the personal computer 20. Although the exemplary environment described herein employs a hard disk, a removable magnetic disk 29 and a removable optical disk 31, it should be appreciated by those skilled in the art that other types of computer readable media which can store data that is accessible by a computer, such as magnetic cassettes, flash memory cards, digital video disks, Bernoulli cartridges, random access memories (RAMs), read-only memories (ROMs) and the like may also be used in the exemplary operating environment.

A number of program modules may be stored on the hard disk, magnetic disk 29, optical disk 31, ROM 24 or RAM 25, including an operating system 35, one or more application programs 36, other program modules 37, program data 38, and an input device mapper 39. A user may enter commands and information into the personal computer 20 through input devices such as a keyboard 40, a pointing device 42, a drawing pad 65, or a game controller such as driving game controller 66. Other input devices (not shown) may include a microphone, joystick, game pad, satellite disk, scanner or the like. These and other input devices are often connected to the processing unit 21 through a serial port interface 46 that is coupled to the system bus, but may be connected by other interfaces, such as a parallel port, game port, universal serial bus (USB), or a 1394 high-speed serial port. A monitor 47 or other type of display device is also connected to the system bus 23 via an interface, such as a video adapter 48. In addition to the monitor 47, personal computers typically include other peripheral output devices (not shown), such as speakers and printers.

The personal computer 20 may operate in a networked environment using logical connections to one or more remote computers, such as a remote computer 49. The remote computer 49 may be another personal computer, a server, a router, a network PC, a peer device or other common network node, and typically includes many or all of the elements described above relative to the personal computer 20, although only a memory storage device 50 has been illustrated in FIG. 1. The logical connections depicted in FIG. 1 include a local area network (LAN) 51 and a wide area network (WAN) 52. Such networking environments are commonplace in offices, enterprise-wide computer networks, Intranets and the Internet.

When used in a LAN networking environment, the personal computer 20 is connected to the local network 51 through a network interface or adapter 53. When used in a WAN networking environment, the personal computer 20 typically includes a modem 54 or other means for establishing communications over the wide area network 52, such as the Internet. The modem 54, which may be internal or external, is connected to the system bus 23 via the serial port interface 46. In a networked environment, program modules depicted relative to the personal computer 20, or portions thereof, may be stored in the remote memory storage device. It will be appreciated that the network connections shown are exemplary and other means of establishing a communications link between the computers may be used.

Input Device Mapper

Figure 2:
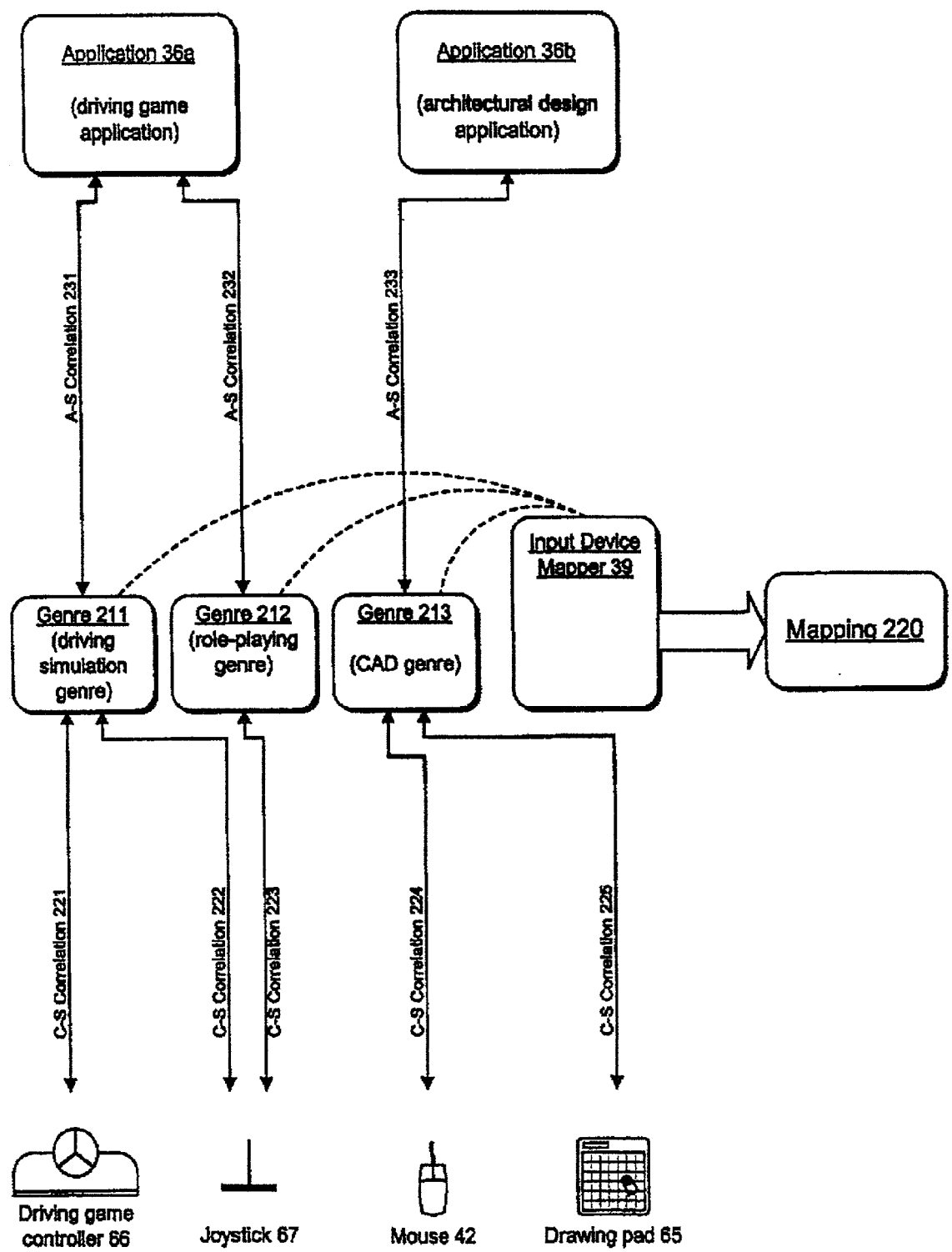
FIG. 2 is a block diagram showing the use of an input device mapper with input devices and software applications.

FIG. 2 depicts the use of an input device manager in accordance with the invention. Input device mapper 39 is a software module that provides an interface between application programs 36 and input devices, such as devices 42, 65, 66, and 67. Input device mapper 39 could be a component of an operating system running on computer 20, such as operating system 35, or a stand-alone software module which runs on an operating system, as shown in FIG. 2.

Input device mapper 39 is associated with several genres, such as genres 211–213. A genre is a semantic vocabulary that encapsulates the common input elements among applications falling into a broad category. A semantic is a label that expresses a behavior that an application exhibits upon operation of a control. Input device mapper 39 is associated with at least one genre; preferably, input device mapper 39 is associated with several genres. The genres associated with an input device mapper may be publicized so that input device manufacturers and software developers can use input device mapper 39 in the manner described below to allow devices and software to work together.

In FIG. 2, genre 211 is an example driving game genre (corresponding to example genre 1 in the Examples section below), genre 212 is an example flight simulator genre (corresponding to example genre 2 in the Examples section below), and genre 213 is an example computer-aided design (CAD) genre (corresponding to example genre 8 in the Examples section below). Input devices 65, 66, 67, and 42 provide input device mapper 39 with correlations between their controls and the semantics of genres 211–213, called "control-semantic" correlations 221–225 (abbreviated "C-S correlation"). C-S correlation 221, which is shown in detail in FIG. 3, correlates the controls on driving game controller 66 with semantics chosen from driving simulation genre 211. Joystick 67 is appropriate for use with both driving simulation applications and flight simulation applications. Therefore, joystick 67 provides two different C-S correlations; C-S correlation 222 provides a link to the controls on joystick 67 with driving simulation genre 211, and C-S correlation 223 provides a link to the controls on joystick 67 with flight simulator genre 212. Mouse 42 and drawing pad 65 provide C-S correlations 224 and 225, respectively, between their controls and CAD genre 213. A device may provide additional C-S correlations for specific purposes. For example, the manufacturer of driving game controller 66 may provide C-S correlation 221 which is appropriate for the driving simulation genre generally, but may also provide additional C-S correlations (not shown), which refine C-S correlation 221 for use with particular driving games. Each C-S correlation may specify the applications (e.g., the "XYZ" driving game) or classes of application (e.g., all applications in a driving simulation genre) with which it may be used. Applications 36a and 36b provide input device mapper 39 with correlations between actions that they perform and genres 211–213, called "action-semantic" correlations 231–233 (abbreviated "A-S correlation"). Driving game application 36a provides A-S correlation 231, which is shown in detail in FIG. 4, between its actions and semantics selected from driving simulation genre 211. Architectural design application 36b provides an A-S correlation between its actions and CAD genre 213. In addition to A-S correlation 231, driving game application 36a also provides A-S correlation 232 between its actions and flight simulator genre 212. Providing two different A-S correlations for a single application is appropriate when the application has two different phases that require different usage of the controls.

Input device mapper 39 receives C-S correlations 221–225 and A-S correlations 231–233. Input device mapper 39 creates a mapping for each application program 36a, 36b, on computer 20. For example, in order to create mapping 220 for driving game application 36a, input device mapper 39 first selects an appropriate device for the driving game genre, by determining which devices have a C-S correlation for the driving simulation genre. If there is more than one device having a C-S correlation for driving simulation genre 211, such as driving game controller 66 and joystick 67, then input device mapper 39 selects one of these devices. The selection may be made in various ways, for example by selecting the first appropriate connected device that input device mapper 39 locates, or by consulting a database of preferred devices for each genre. For example, input device mapper 39 selects game controller 66 because it is the first device that it locates which supports driving simulation genre 211. Once the device is selected, input device mapper 39 uses C-S correlation 221 and A-S correlation 231 to map controls on game controller 66 into actions that driving game application 36a performs. Input device mapper 39 may create the mapping by performing a simple matching (i.e., by referring to C-S correlation 221 and A-S correlation 231 and linking each control with an action that is correlated with the same semantic), or it may take into account user preferences or overrides, as discussed below in the text accompanying FIG. 6.

Input device mapper may create a second mapping (not shown) for a different phase of an application that requires controls to be used in a different context, such as the role-playing phase of driving simulation game 36a. That mapping is created by selecting an appropriate device for the role-playing genre to map the controls on joystick 67 into the actions for the role-playing phase of game application 36a. Some applications change context frequently, such as a baseball game application, where the context of the controls is different for pitching than it is for batting.

FIG. 3 depicts the detail of sample C-S correlation 221. Controls 301 represent controls on driving game controller 66. Semantics 302 are semantics chosen from driving simulation genre 211. C-S correlation 221 links controls 301 with semantics 302. In the example depicted by FIG. 3, "Trigger 1" on game controller 66 is associated with the semantic "FIRE", "Button 1" is associated with the semantic "SHIFT UP", etc.

FIG. 4 depicts the detail of sample A-S correlation 231. Actions 401 represent actions that driving game application program 236 can perform at the user's request. Semantics 402 are semantics chosen from driving simulation genre 211. In the example depicted by FIG. 4, the action performed by the driving game described as "turn left or right" is associated with the semantic "STEER", "speed up" is associated with the semantic "ACCELERATE", etc.

Figure 5:
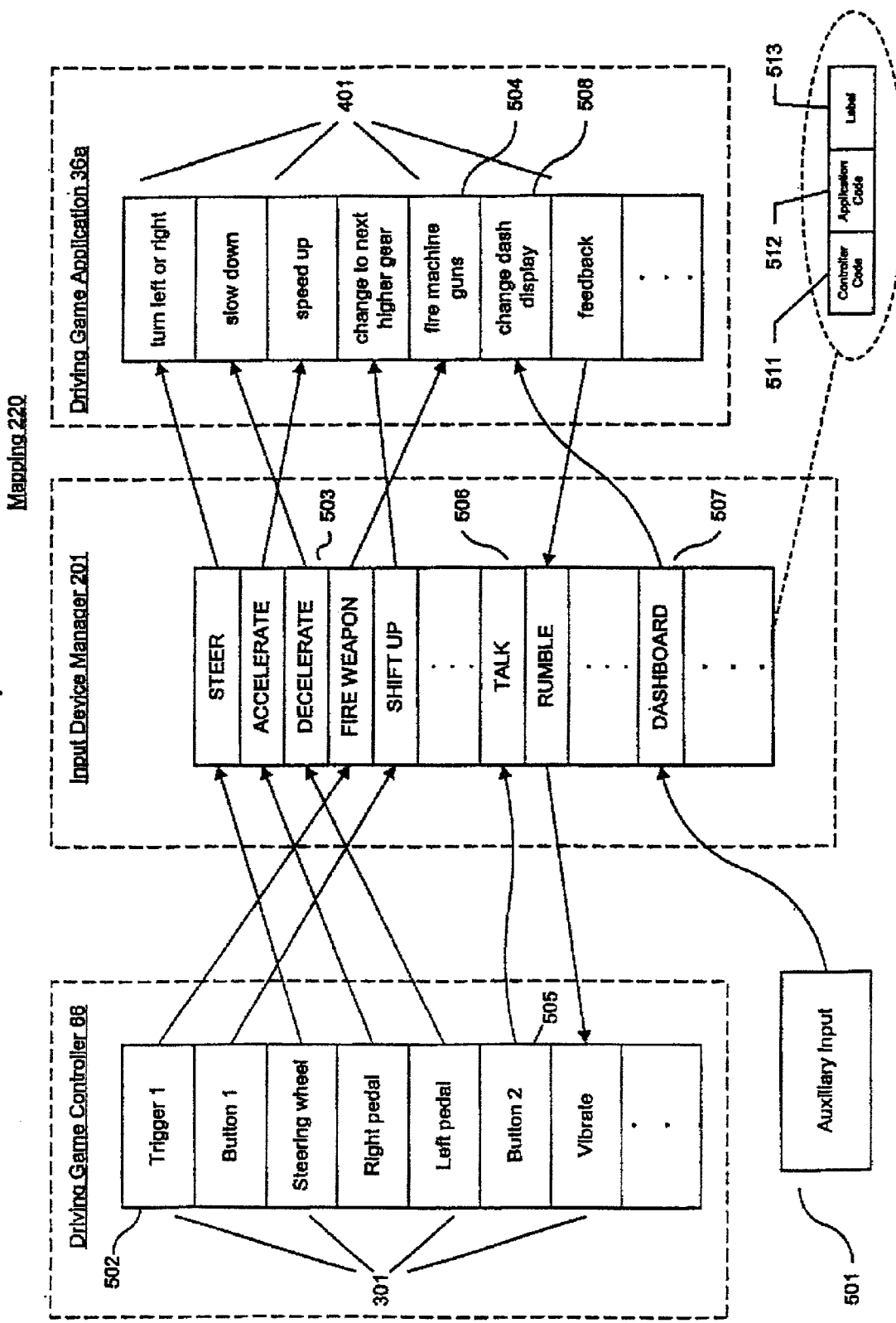
FIG. 5 is a block diagram showing a sample mapping created by an input device mapper.

FIG. 5 depicts a sample mapping 220 created by input device mapper 39, which links the controls on game controller 66 with actions performed by driving game application 36a. Controls 301 are correlated with semantics, as defined in C-S correlation 221. The semantics are correlated with software actions 401, as defined in A-S correlation 231. In the example, "trigger 1" 502 on game controller 66 is correlated with the semantic "FIRE" 503, which, in turn, is correlated with the software action "fire machine guns" 504.

The detail of an entry in the mapping is shown in items 511–513. Each entry contains a controller code 511, an application code 512, and a label 513. The controller code 511 is the data that an input device generates when a particular control has been operated. For example, game controller could signify that trigger 1 has been pressed by generating the number "1002." The application code 512 is the item of input that an application expects to receive as an instruction to perform a particular action. For example, the input "64379" could instruct driving game application 36a to fire machine guns. Label 513 is a text string provided by application program 36a, which is a plain language description of the action that application program 36a will perform upon receiving application code 512 as its input. For example, "fire machine guns" is a label describing the action that will be performed by driving game application 36a when trigger 1 is depressed. The labels are helpful for displaying a graphic representation of the mapping, as described below in the text accompanying FIG. 6.

FIG. 5 also shows a control labeled "button 2" 505 on game controller 66, which is correlated with the semantic "TALK" 506, which might be appropriate for the action of operating a two-way radio to talk with other drivers. This correlation means that button 2 would be mapped to an action correlated with the "TALK" semantic in an application that has such an action. Driving game application 36a, however, does not have an action correlated with the "TALK" semantic; therefore, button 2 on game controller 66 does not map to any action in driving game application 36a.

It will also be observed in FIG. 5 that mapping 220 uses a semantic "DASHBOARD" 507, which is correlated with the action in driving game application 36a of changing the dash display, and it will also be observed that game controller 66 does not have a control correlated with the "DASHBOARD" semantic. A feature of input device mapper 39 is that it provides an application with the model that all of the defined semantics in a genre are supported in any computer system on which the application may be running, such as computer 20. For example, even though game controller 66 does not have a control correlated with the "DASHBOARD" semantic, driving game 36a may still correlate its "change dash display" action with the semantic "DASHBOARD," and input device mapper 39 will locate an appropriate auxiliary input for that action. In mapping 220, auxiliary input 501 is selected by input device mapper 39 to implement the "DASHBOARD" semantic. Auxiliary input 501 may be a key on keyboard 40, an unused control on game controller 66 such as control 505, a pop-up menu that the user can control with pointing device 42, or any other mechanism by which the user can communicate with computer 20.

The genres may be defined such that some semantics must be mapped to the primary input device selected by input device mapper 39 and may not be mapped to an auxiliary input outside of that device. For example, in the genres provided below in the Examples section, controls are divided into the categories "priority 1" and "priority 2." A priority 1 control is a control that must be mapped to the primary input device and may not be implemented by an auxiliary input. A priority 2 control is a control that may be implemented on the primary input device, if a control is available. For example, in the genre "driving sim without weapons" shown in below in the Examples section, steering is a priority 1 control, so the "steer" semantic must be implemented on the primary input device selected by input device mapper 39, such as game controller 66. However, "dashboard" is a priority 2 control, so it may be implemented by any type of auxiliary input. Some other controls, which may be designated as "priority 3," are never implemented by the device used for the mapping, and therefore the genres do not define semantics to correlate with these controls. For example, a game application may provide a pop-up menu to change the background color of the screen, select the background music accompanying the game, select weapons to be carried, etc. Because no semantics are defined for priority 3 functions, they are either implemented by the application through explicit manipulation of the controller code 511 or by requesting a generic mapping from the input device mapper 39.

Figure 6:
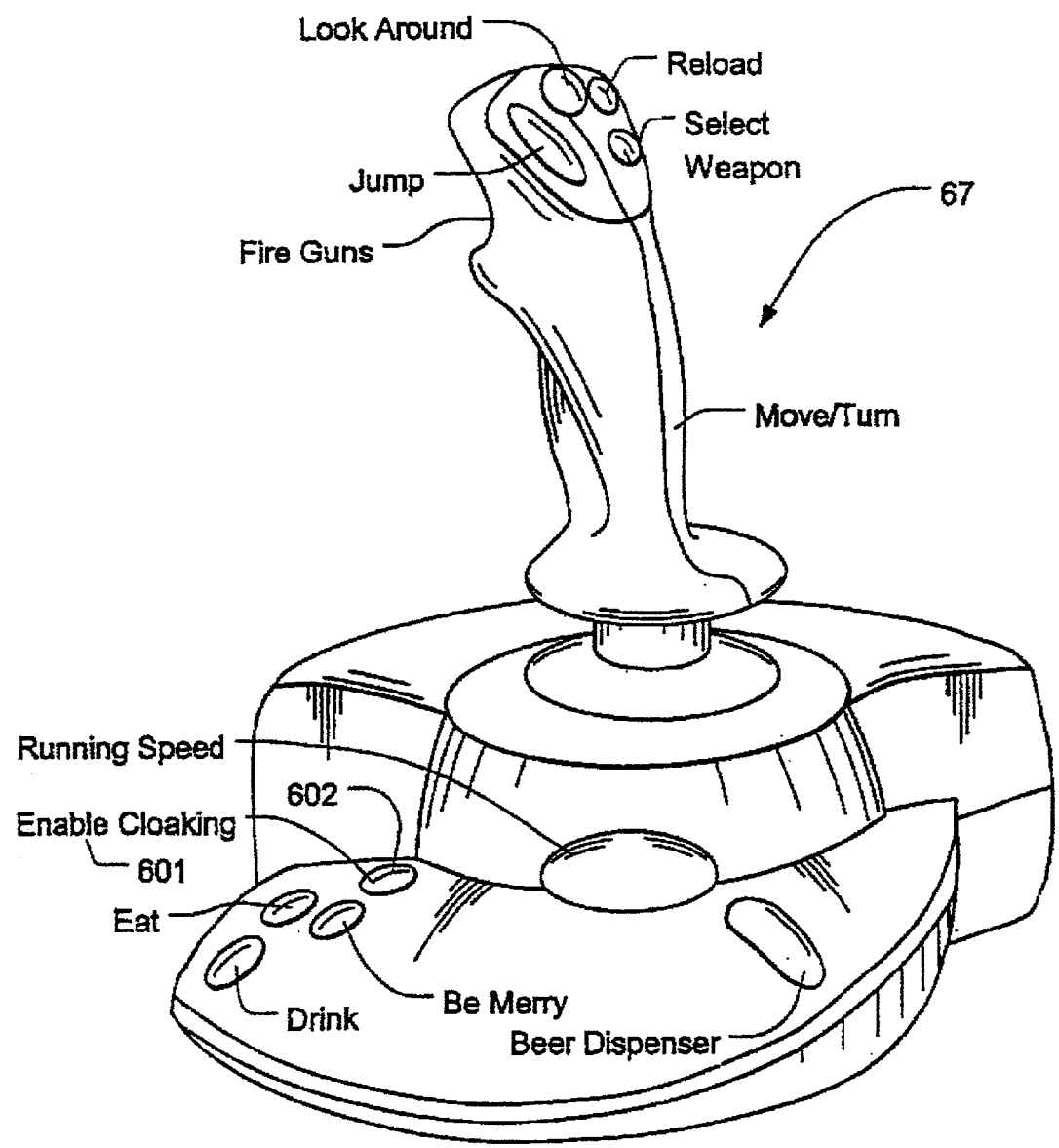
FIG. 6 is an image of an input device with action labels, as displayed by an input device mapper.

It is also possible for a user to affect a mapping created by input device mapper 39, either by providing a set of preferences for input device mapper 39 to take into account in creating the mapping, or by modifying a mapping after it has been created. For example, a user may create a set of preferences specifying that button 1 on game controller 66 should always map to the semantic "HONK_HORN" in every application falling into a driving simulation genre. A user may also modify a mapping that has been created: Input device mapper 39 may provide the user with a display showing the device controls that have been mapped to particular software actions, and may permit the user to change the mapping. FIG. 6 depicts such a display, as might appear for joystick 67. The manufacturer of joystick 67 may provide a bitmap image or 3D model of the device, with blank text fields that are filled in with data from the application. The data is provided by the application as part of the A-S correlation in the form of text strings; the application may provide a text string label for each action, and the labels may be displayed with an image of the device. For example, text field 601 is filled in with the text "enable cloaking device," which indicates that button 602 is mapped to a cloaking device action in the game application. This text string was provided to input device mapper 39 in an A-S correlation and becomes part of the mapping, as depicted in elements 511–513 in FIG. 5. The user can create a custom mapping, for example by using a mouse 42 to rearrange the labels on the displayed image of the device. If the user creates a custom mapping, input device mapper 39 may interpret the user's changes as the expression of a set of preferences. For example, if a user uses the display depicted in FIG. 6 to modify the mapping of joystick 67 into the actions for a game in the first-person genre, input device mapper 39 may interpret the user's choice as a general preference that joystick 67 should work similarly with all games in first-person genres (i.e., that button 602 should enable a cloaking device in any first-person game that offers a cloaking device). The user's preferences may be stored in a file or database for future use by the user. Additionally, storing the preferences in a file or database permits the preferences to be easily ported from computer 20 to any other machine on which input device mapper 39 has been implemented, thus permitting consistent mappings across several machines.

Use of the Input Device Mapper

Figure 7:
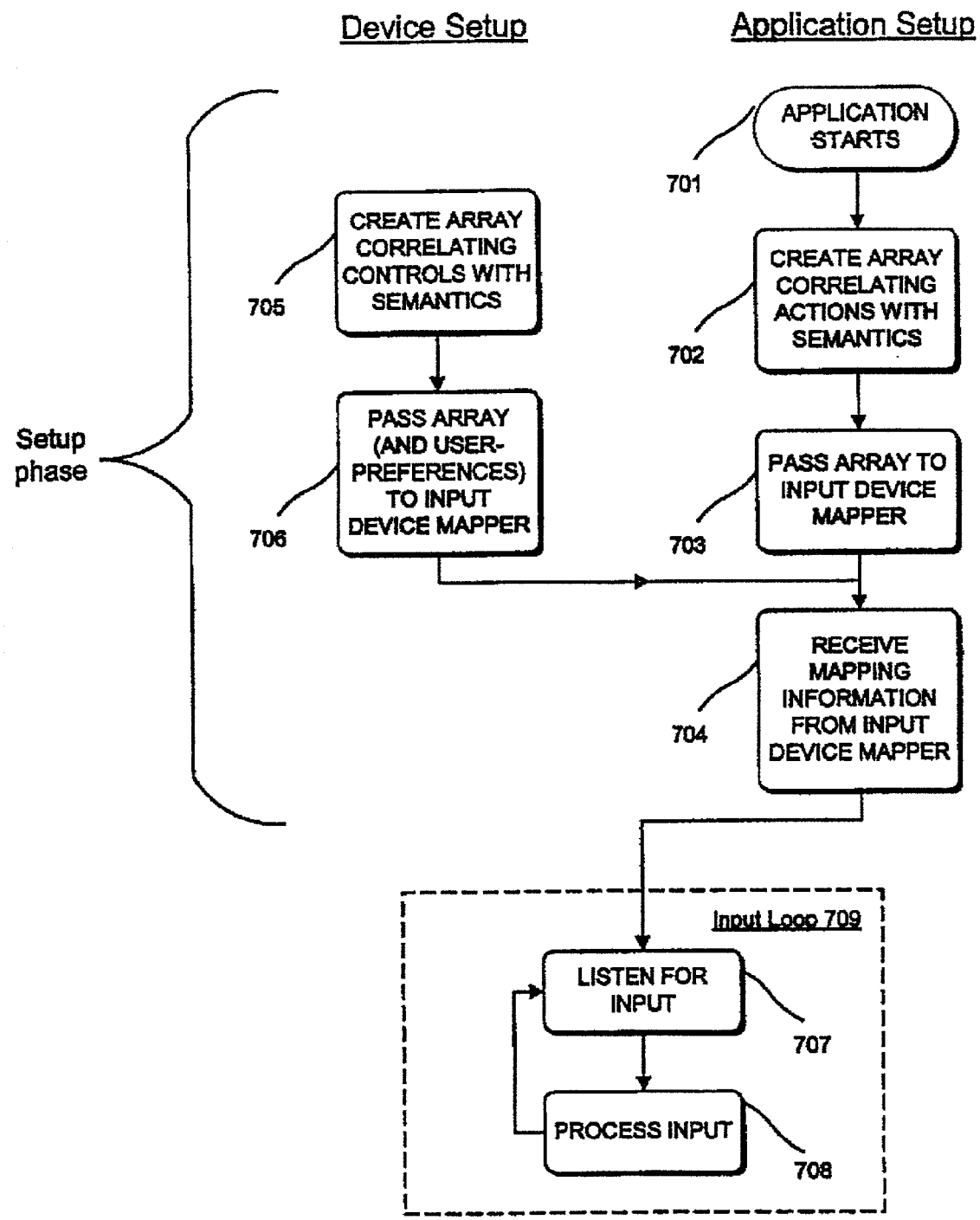
FIG. 7 is a flowchart illustrating the process by which an input device mapper maps controls to actions.

FIG. 7 is a flowchart showing an example use of an input device mapper in accordance with the present invention, and the steps to initiate its use. As shown in FIG. 6 and described in detail below, a device and an application both undergo a setup phase, in which they pass their respective C-S and A-S correlations to an input device mapper; the application program then receives and processes input in accordance with the mapping.

Steps 701 through 704 relate to the setup of an application program for use with input device mapper 39. An application program, such as driving game application 36a, begins execution at step 701. At step 702, the application creates an array correlating actions with semantics. For example, application 36a could create an array representing A-S correlation 231. The array created at step 702 is passed to input device mapper 39 at step 703.

One method of representing A-S correlation 231 in the array created as step 702 is to assign a unique value to each action and to each semantic. For example, the semantics in genre 211, which are used in A-S correlation 231 and C-S correlation 221, may be assigned unique values as follows: 1 represents "STEER", 2 represents "ACCELERATE", etc. In a programming environment that supports symbolic constants, such as C++, it is convenient to represent the values as symbols. Input device mapper 39 may define the set of available genres and assign symbolic constants to each semantic, which may be exported to users of input device mapper 39 in a header file. Similarly, unique values may be assigned to each action that application program 36a performs, which may also be represented by symbolic constants in an appropriate programming environment. The array created at step 702 then contains a sequence of ordered tuples, where each tuple includes, in a defined order, a value representing an action performed by the application, and a value representing a semantic correlated with that action.

Steps 705 and 706, which relate to the setup of a device for use with an input device mapper in accordance with the invention, take place asynchronously with respect to steps 701, 702, and 703. For an input device connected to computer 20, an array is created at step 705 correlating the controls on the device with semantics from a particular genre. For example, an array may be created representing C-S correlation 221, which correlates the controls on device 66 with semantics chosen from genre 211. The C-S correlation may be represented in an array in a manner analogous to that used to represent an A-S correlation, as described above: unique values are associated with each control, and an array is constructed to contain a sequence of ordered tuples, where each tuple includes, in a defined order, a value representing a control and a value representing a semantic correlated with the control. When multiple C-S correlations exist for a given device, they may be represented in multiple arrays. The array(s) created at step 705 is (are) passed to input device mapper 39 at step 706. Optionally, any user preferences that have been specified may also be passed to input device mapper 39 in an appropriate format at step 706.

The creation of the array at step 705 may take place long before application 36a begins executing, or at any time prior to steps 704 and 706. For example, the supplier of game controller 66 may create C-S correlation 221 at the time game controller 66 is designed, and supply an array representing C-S correlation 221 along with game controller 66 on a medium such as magnetic disk 29 or optical disk 31; this array can then be passed to input device mapper 39 at step 706 by loading it into computer 20 through magnetic drive 28 or optical drive 30. Alternatively, game controller 66 may be known to the designer of input device mapper 39, in which case the array may be built into input device mapper 39.

Figure 8:
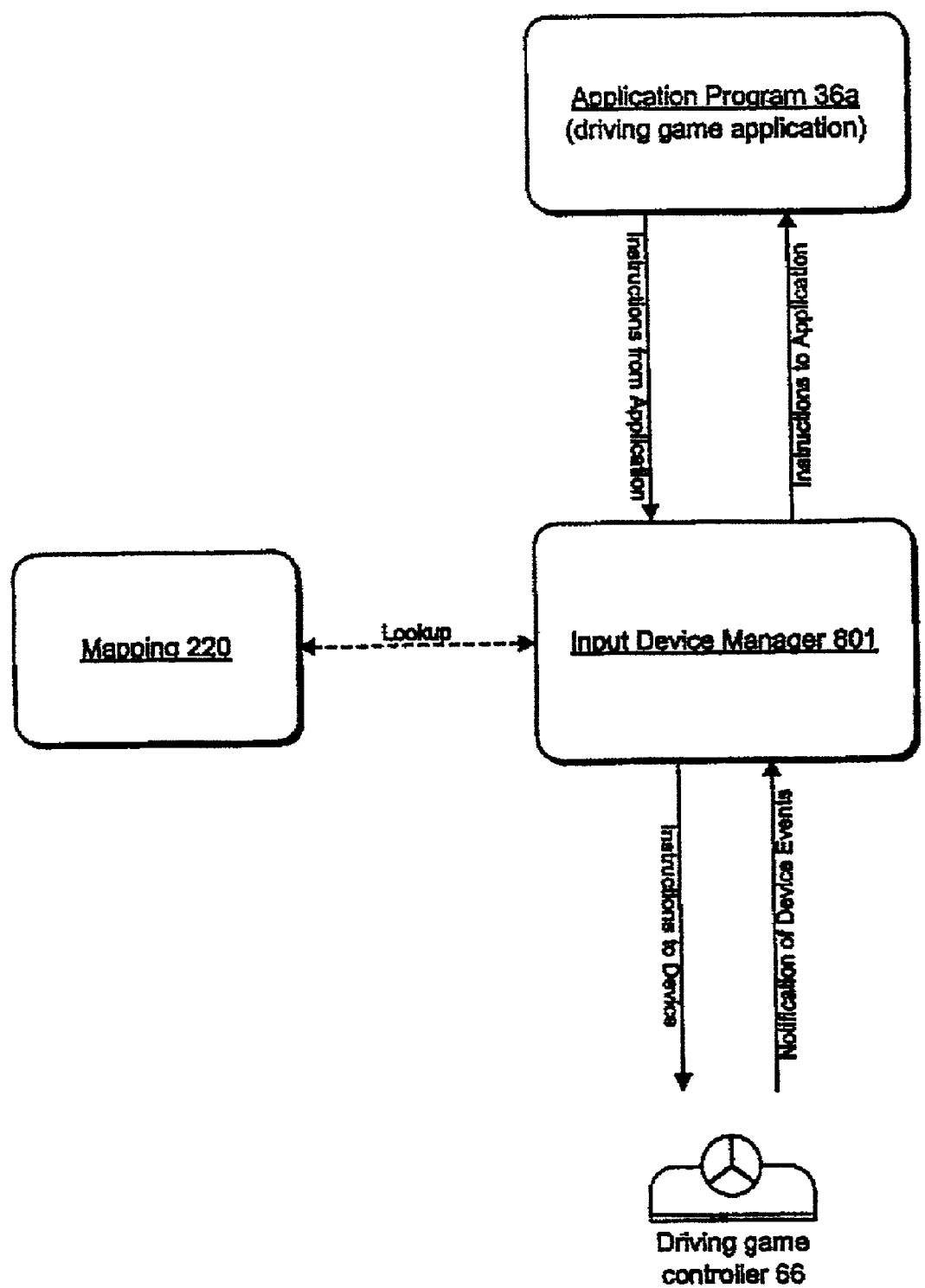
FIG. 8 is a block diagram showing the use of a mapping created by an input device mapping.

Step 704 takes place after steps 703 and 706 have been completed. After input device mapper 39 has received the arrays created at step 702 and the array created at step 705, it creates a mapping, such as mapping 220, by the process described above in the text accompanying FIG. 5. After the mapping has been created, input device mapper 39 may provide mapping information to application program 36a at step 704. The mapping information provided may include information about which device control is correlated with each application-defined action. If the mapping is provided to application program 36a at step 704, then application program 36a can use the mapping to convert notifications of device events into actions that application program 36a performs. Alternatively, instead of providing the mapping to application program 36a, the mapping may be provided to an input device manager, which is depicted in FIG. 8 and described below, which uses the mapping to translate device event notifications into input for application program 36a. In the case where an input device manager is used to translate device event notifications into application program input, it is not necessary to provide the mapping to application program 36a, in which case step 704 can be omitted.

Following step 704, application program 36a begins its input loop 709, which comprises listening for input at step 707, processing the input at step 708, and returning to step 707 to listen for more input. When the mapping has been provided to application program 36a at step 704, application program 36a can use the mapping to process the input. In this case, application program would receive notification of events on an input device, such as game controller 66, and would use the mapping to look up what actions to perform in response to a given event. Alternatively, when an input device manager is used, as depicted in FIG. 8 and discussed below, the input device manager translates each device event notification into an instruction to application program 36a to perform a particular action. In this case, application program 36a does not perform any lookup into the mapping in processing step 707; it simply follows instructions received from the input device manager.

FIG. 8 shows an input device manager 801, which uses mapping 220 created by input device mapper 39 to provide communication between driving game application 36a and game controller 66. Input device manager 801 operates during execution of an application program, and uses a mapping to translate notification of input device events into commands to the application program. For example, in FIG. 8, input device manager 801 uses mapping 220, which is depicted in FIG. 5, to translate between events on game controller 66 and driving game application 36a. Driving game controller 66 sends input device manager 801 a data item signifying that an event has happened, such as the pressing of the right pedal. Input device manager 801 performs a lookup in mapping 220, and determines that the data received is correlated with the semantic "ACCELERATE," which, in turn, is correlated with the action "speed up." Input device manager 801 then sends into the input stream of driving game application 36a data representing an instruction to perform the "speed up" action.

In addition to providing instructions to driving game application 36a, input device manager 801 may also provide other information including the duration of its operation, a timestamp for the operational event (e.g., button 1 was pressed at time=T1, x-axis was moved to position −32 at time=T2, etc.), or a parameter further describing the device event (e.g., in addition to data signifying that motion along the x-axis has occurred, input device manager 801 may also provide data indicating the magnitude and direction of the motion, or data indicating the resulting position of the control). An application, such as driving game application 36a, may be interested in this information. For example, the firing of a weapon may become more rapid after trigger 1 has been depressed for more than one second. A different game application might cause a pinball cue or a slingshot to be pulled back further the longer a button has been depressed.

It should also be noted that mappings are per device. That is, the application does not make a single call to obtain mappings for all devices. Rather, the application does one call per input device that the application intends to use. Input device manager 801 may receive event notifications from multiple devices, while reporting events from discrete devices in a consistent manner. By doing so, it allows an application to be controlled by various devices while allowing the application to view events without regard to the nature of the underlying device. For example, the auxiliary input used to implement the "change dash display" action correlated with the "DASHBOARD" semantic in driving game 36a could be the "D" key on keyboard 40 (not shown in FIG. 8). Input device manager 801 will receive notification that the "D" key on keyboard 40 has been pressed, and will translate this notification into an instruction to driving game application 36a. The type of device from which of the input was created is transparent to application 36a, which knows only that it has received the instruction to perform the action correlated with the semantic "DASHBOARD."

When an application and a device are configured such that the application can instruct the device to perform certain actions, input device manager 801 can also use mapping 220 to convey these instructions from the application to the device.

A further type of information that might be conveyed to input device manager 801 from an application is the application's context, so that input device manager 801 can change the sense of the controls to match their use in the present phase of the game. For example, driving game 36a may notify input device manager 801 when it has changed from the driving simulation genre to the role-playing genre, so that the use of the controls will be appropriate for the current phase of the game; as another example, a baseball game application may notify the input device manager when it changes from a batting context to a fielding context. Input device manager 801 uses this information to look up the appropriate mapping information for the present context.

It is noted that the foregoing examples have been provided merely for the purpose of explanation and are in no way to be construed as limiting of the present invention. While the invention has been described with reference to preferred embodiments, it is understood that the words which have been used herein are words of description and illustration, rather than words of limitations. Further, although the invention has been described herein with reference to particular means, materials and embodiments, the invention is not intended to be limited to the particulars disclosed herein; rather, the invention extends to all functionally equivalent structures, methods and uses, such as are within the scope of the appended claims. Particularly, while the invention has been described in terms of the use of a game controller with a game application, it is in no way limited to game hardware and software; on the contrary, it will be appreciated by those skilled in the art that the invention can be used with all types of software and input hardware. Those skilled in the art, having the benefit of the teachings of this specification, may effect numerous modifications thereto and changes may be made without departing from the scope and spirit of the invention in its aspects.

EXAMPLES

The following are examples of genres that could be used with an input device mapper. The semantics in each genre are divided into "priority 1" semantics and "priority 2" semantics, which are described below:

Genre 1: Combat Driving sim, with weapons

| Semantic | Description |
| --- | --- |
| Priority 1 Controls | |
| Steer | left/right |
| Accelerate | faster/slower |
| Brake | Brake |
| Weapons | select next weapon |
| Fire | fires selected weapon |
| Target | selects next available target |
| Menu | pause, show menu of priority 2 & 3 controls |
| Priority 2 Controls | |
| Look | forward/right/backward/left |
| View | cycle through view options |
| Device | show device and controls |
| Dashboard | select next dashboard/heads-up display option |
| Press to talk | for voice communication |

-continued

Genre 1: Combat Driving sim, with weapons

| Semantic | Description |
|---|---|
| Up shift | select next higher gear |
| Down shift | select next lower gear Reverse from neutral |

Genre 2: Flying Sim, without weapons

| Semantic | Description |
|---|---|
| Priority 1 Controls | |
| Bank | bank ship left/right |
| Climb/dive | pitch up/down |
| Throttle | faster/slower |
| Brake | brake |
| Menu | pause, show menu of priority 2 & 3 controls |
| Priority 2 Controls | |
| Look | forward or up/back or down/left/right |
| Rudder | turn ship left/right |
| View | select next view (in the cockpit, behind plane, etc.) |
| Display | select next on-screen display options, maps, etc. |
| Flaps up | |
| Flaps down | |
| Toggle Gear | Gear up/down |
| Press to talk | voice communication |
| Device | displays input device and controls |

Genre 3: Role Playing

| Semantic | Description |
|---|---|
| Priority 1 Controls | |
| Move | forward/back/left/right |
| Get | pick up and carry item |
| Select Inventory | select next inventory item |
| Apply | use selected inventory item |
| Attack | |
| Cast | cast spell |
| Talk | communicate |
| Crouch | crouch, climb down, swim down |
| Jump | jump, climb up, swim up |
| Menu | pause, show menu of priority 2 & 3 controls |
| Priority 2 Controls | |
| Look | forward or up/back or down/left/right usually maps to point of view ("POV") on devices that have one |
| Map | cycle through map options |
| Display | shows next on-screen display options, maps, etc. |
| Press to talk | voice communication (multi-player) |
| Rotate | turn body left/right |
| Device | displays input device and controls |

Genre 4: Hunting

| Semantic | Description |
|---|---|
| Priority 1 Controls | |
| Move | move forward/backward/left/right - or - aim up/down/left/right |
| Aim | toggle "Move" axis above between aim and move |

Genre 4: Hunting

| Semantic | Description |
|---|---|
| Fire | fire selected weapon |
| Weapon | select next weapon (cycle through options) |
| Binoculars | look through binoculars |
| Call | make animal call |
| Map | view map |
| Special | do game special operation (rattle, eat) |
| Menu | pause, show menu of priority 2 & 3 controls |
| Priority 2 Controls | |
| Look | forward or up/back or down/left/right usually maps to POV on devices that have one |
| Display | shows next on-screen display options, maps, etc. |
| Press to talk | voice communication (multi-player) |
| Rotate | turn body left/right |
| Crouch | crouch, climb down, swim down |
| Jump | jump, climb up, swim up |
| Device | displays input device and controls |

Genre 5: Real Time Strategy

| Semantic | Description |
|---|---|
| Priority 1 Controls | |
| Scroll | up/down/left/right |
| Select | Select unit/object/item |
| Instruct | cycle through instructions |
| Apply | apply selected instruction |
| Team | select next team (cycle through all) |
| Building | select next building |
| Menu | pause, show menu of priority 2 & 3 controls |
| Priority 2 Controls | |
| Map | cycle through map options |
| Display | shows next on-screen display options, maps, etc. |
| Press to talk | voice communication (multi-player) |
| Device | displays input device and controls |

Genre 6: Baseball

| Semantic | Description |
|---|---|
| Priority 1 Controls - batting | |
| Aim | aim where to hit |
| Select | cycle through swing options |
| Normal | normal swing |
| Power | swing for the fence |
| Bunt | bunt |
| Steal | have base runner attempt to steal a base |
| Burst | have base runner invoke burst of speed |
| Slide | have base runner slide into base |
| Box | Enter or exit batting box |
| Menu | pause, show menu of priority 2 & 3 controls |
| Priority 2 Controls - batting | |
| (none) | |
| Priority 1 Controls - pitching | |
| Aim | aim where to pitch |
| Select | cycle through pitch selections |
| Pitch In | throw pitch into strike zone |
| Pitch Out | throw pitch outside of strike zone |
| Base | select base to throw to |
| Throw | throw to base |

-continued

Genre 6: Baseball

| Semantic | Description |
|---|---|
| Catch | catch hit ball |
| Menu | pause, show menu of priority 2 & 3 controls |
| Priority 1 Controls - fielding | |
| Aim | aim where to run or throw |
| Nearest | switch to fielder nearest to the ball |
| Conservative Throw | make conservative throw |
| Aggressive Throw | make aggressive throw |
| Burst | invoke burst of speed |
| Jump | jump to catch ball |
| Dive | dive to catch ball |
| Menu | pause, show menu of priority 2 & 3 controls |
| Priority 2 Controls - fielding | |
| (none) | |

Genre 7: 2D side to side movement

| Semantic | Description |
|---|---|
| Priority 1 Controls | |
| Move | left/right/jump or climb or swim up/down |
| Throw | throw object |
| Carry | carry object |
| Attack | attack |
| Special | apply special move |
| Select | select special move |
| Menu | pause, show menu of priority 2 & 3 controls |
| Priority 2 Controls | |
| View | scroll view left/right/up/down usually maps to POV on devices that have one |
| Device | displays input device and controls |

Genre 8: 2D Object Control (CAD)

| Semantic | Description |
|---|---|
| Priority 1 Controls | |
| Move | move object or scroll view up/down/left/right |
| View | select between move and scroll |
| Zoom | in/out |
| Select | |
| Special 1 | do first special operation |
| Special 2 | do second special operation |
| Special 3 | do third special operation |
| Special 4 | do fourth special operation |
| Menu | pause, show menu of priority 2 & 3 controls |
| Priority 2 Controls | |
| Rotate Z | rotate object or view clockwise/counterclockwise |
| Display | shows next on-screen display options, etc. |
| Device | displays input device and controls |

Genre 9: Browser Control

| Semantic | Description |
|---|---|
| Priority 1 Controls | |
| Pointer | Move on screen pointer |
| Select | Select current item |
| Forward/Back | Move between items already seen |
| Page Up/Down | Move view up/down |
| Search | Use search tool |
| Refresh | Refresh |
| Stop | Cease current update |
| Priority 2 Controls | |
| Home | Go directly to "home" location |
| Favorites | Mark current site as favorite |
| Next | Select Next page |
| Previous | Select Previous page |
| History | Show/Hide History |
| Print | Print current page |

COM: Binary Compatibility

Figure 9:
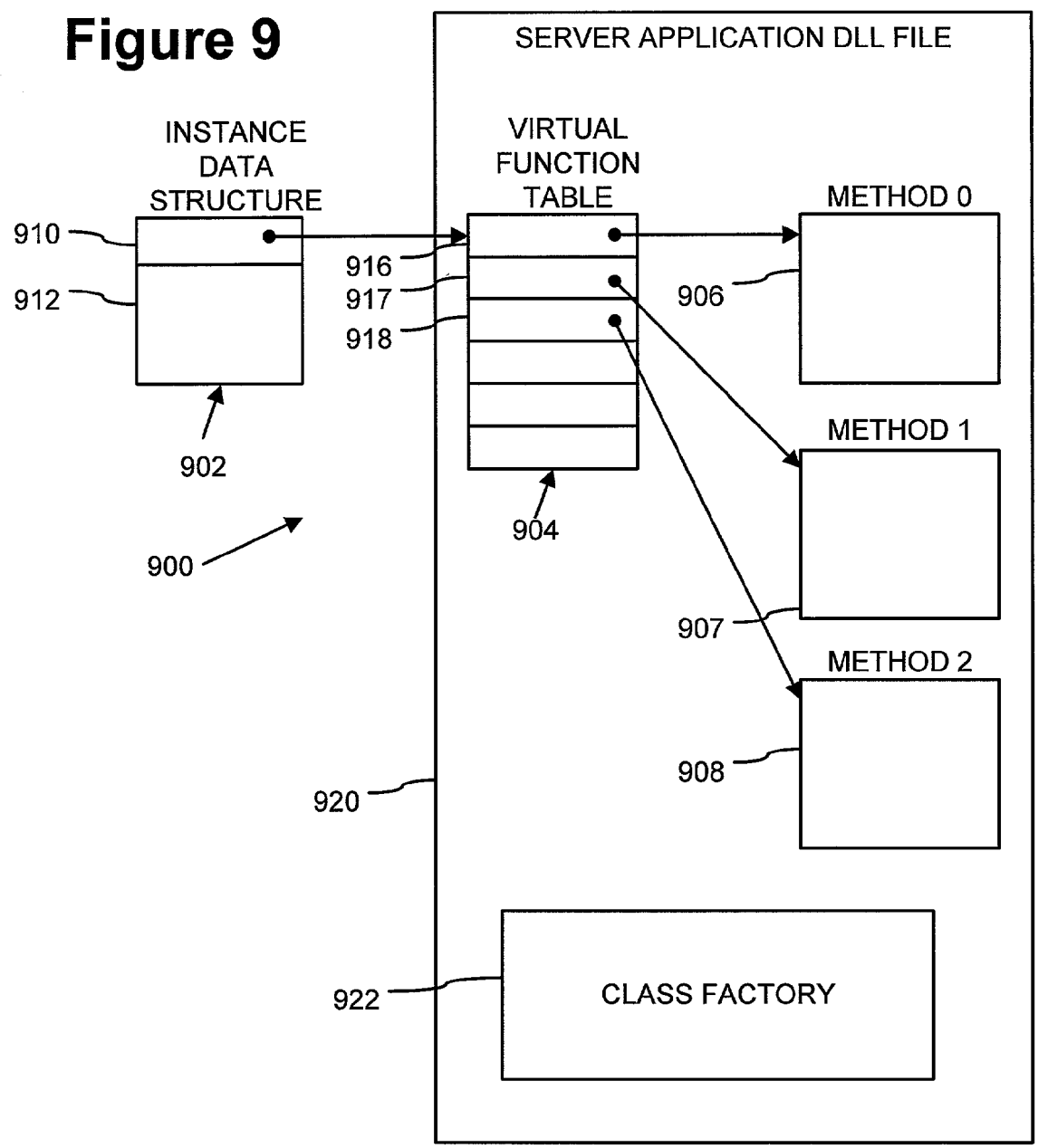
FIG. 9 is a block diagram of a Microsoft Component Object Model software component that can be used to implement the present invention.

FIG. 9 is a block diagram of a Microsoft Component Object Model software component that can be used to implement the present invention. The COM specification defines binary standards for objects and their interfaces, which facilitate the integration of software components into applications. COM specifies a platform-standard binary mapping for interfaces, but does not specify implementations for interfaces. In other words, an interface is defined, but the implementation of the interface is left up to the developer. The binary format for a COM interface is similar to the common format of a C++ virtual function table. Referring to FIG. 9, in accordance with COM, the COM object 900 is represented in the computer system 20 (FIG. 1) by an instance data structure 902, a virtual function table 904, and member methods (also called member functions) 906–908. The instance data structure 902 contains a pointer 910 to the virtual function table 904 and data 912 (also referred to as data members, or properties of the object). A pointer is a data value that holds the address of an item in memory. The virtual function table 904 contains entries 916–918 for the member methods 906–908. Each of the entries 916–918 contains a reference to the code 906–908 that implements the corresponding member methods. A reference to an interface is stored as a pointer to the pointer 910.

While extremely simple, the binary mapping provides complete binary compatibility between COM components written in any language with any development tool. Any language that can call a function through a pointer can use COM components. Any language that can export a function pointer can create COM components. Language-neutral binary compatibility is an important feature of COM.

COM: Strongly Typed Interfaces and Interface Descriptor Language

The pointer 910, the virtual function table 904, and the member methods 906–908 implement an interface of the COM object 900. By convention, the interfaces of a COM object are illustrated graphically as a plug-in jack as shown in object 1100 in FIG. 11. Also, interfaces conventionally are given names beginning with a capital "I." In accordance with COM, the COM object 900 can include multiple interfaces, which are implemented with one or more virtual function tables. The member function of an interface is denoted as "IInterfaceName::MethodName."

All first-class communication in COM takes place through well-defined, binary-standard interfaces, which are strongly typed references to a collection of semantically related functions.

Programmatically, interfaces are described either with an Interface Definition Language (IDL) or with a package of compiled metadata structures called a type library. Whether expressed in IDL or a type library, the interface definition enumerates in detail the number and type of all arguments passed through interface functions. Each interface function can have any number of parameters. To clarify semantic features of the interface, IDL attributes can be attached to each interface, member function, or parameter. In IDL syntax, attributes are enclosed in square brackets ([ ]). Attributes specify features such as the data-flow direction of function arguments, the size of dynamic arrays, and the scope of pointers. Syntactically, IDL is very similar to C++. Moreover, the interface definition has a purpose similar to that of a function prototype in C++; it provides a description for invocation, but not an implementation. An IDL compiler maps the interface definitions into a standard format for languages such as C++, Java, or Visual Basic. For example, the Microsoft IDL compiler, MIDL, can map interfaces into C++ or export compiled IDL metadata to a type library. (For a detailed discussion of COM and OLE, see Kraig Brockschmidt, Inside OLE, Second Edition, Microsoft Press, Redmond, Wash. (1995)).

COM: Globally Unique Identifiers

In COM, classes of COM objects are uniquely associated with class identifiers ("CLSIDs"), and registered by their CLSID in the registry. The registry entry for a COM object class associates the CLSID of the class with information identifying an executable file that provides the class (e.g., a DLL file having a class factory to produce an instance of the class). Class identifiers are 128-bit globally unique identifiers ("GUIDs") that the programmer creates with a COM service named "CoCreateGUID" (or any of several other APIs and utilities that are used to create universally unique identifiers) and assigns to the respective classes. The interfaces of a component are also immutably associated with interface identifiers ("IIDs"), which are also 128-bit GUIDs. If an interface changes, it receives a new IID.

COM: Implementation

The virtual function table 904 and member methods 906–908 of the COM object 900 are provided by an object server program 920 (hereafter "object server DLL") which is stored in the computer 20 (FIG. 1) as a dynamic link library file (denoted with a ".dll" file name extension). In accordance with COM, the object server DLL 920 includes code for the virtual function table 904 and member methods 906–908 of the classes that it supports, and also includes a class factory 922 that generates the instance data structure 902 for an object of the class.

Other objects and programs (referred to as a "client" of the COM object 900) access the functionality of the COM object by invoking the member methods through the COM object's interfaces. First, however, the COM object must be instantiated (i.e., by causing the class factory to create the instance data structure 902 of the object); and the client must obtain an interface pointer to the COM object.

Before the COM object 900 can be instantiated, the object is first installed on the computer 20. Typically, installation involves installing a group of related objects called a package. The COM object 900 is installed by storing the object server DLL file(s) 920 that provides the object in data storage accessible by the computer 20 (typically the hard drive 27), and registering COM attributes (e.g., class identifier, path and name of the object server DLL file 920, etc.) of the COM object in the system registry. The system registry is a per-machine component configuration database.

COM: Component Instantiation

A client requests instantiation of the COM object locally or on a remote computer using system-provided services and a set of standard, system-defined component interfaces based on class and interface identifiers assigned to the COM Object's class and interfaces. More specifically, the services are available to client programs as application programming interface (API) functions provided in the COM library, which is a component of the Microsoft Windows NT operating system in a file named "OLE32.DLL." The DCOM library, also a component of the Microsoft Windows NT operating system in "OLE32.DLL," provides services to instantiate COM objects remotely and to transparently support communication among COM objects on different computers.

In particular, the COM library provides "activation mechanism" API functions, such as "CoCreateInstance( )," that the client program can call to request local or remote creation of a component using its assigned CLSID and an IID of a desired interface. In response to a request, the "CoCreateInstance( )" API looks up the registry entry of the requested CLSID in the registry to identify the executable file for the class. The "CoCreateInstance( )" API function then loads the class' executable file either in the client program's process, or into a server process which can be either local or remote (i.e., on the same computer or on a remote computer in a distributed computer network) depending on the attributes registered for the COM object 900 in the system registry. The "CoCreateInstance( )" API uses the class factory in the executable file to create an instance of the COM object 900. Finally, the "CoCreateInstance( )" API function returns a pointer of the requested interface to the client program.

COM: In-process, Cross-process, and Cross-machine Communication

Binary compatibility gives COM components true location transparency. A client can communicate with a COM component in the same process, in a different process, or on an entirely different machine. Stated more succinctly, COM supports in-process, cross-process, or cross-machine communication. The location of the COM component is completely transparent to the client because in each case the client still invokes the component by calling indirectly through an interface's virtual function table. Location transparency is supported by two facilities: MIDL generation of interface proxies and stubs, and the system registry.

Overview of Mapper API

DirectInput is the DirectX API for communicating with human interface devices, such as mice, keyboards, game controllers, and force feedback devices. The DirectInput Mapper ("the Mapper") is designed to provide a common interface between devices and most game genres. The intent is to simplify the interface from devices to games and reduce the need for custom game drivers, custom device "profilers," and custom configuration user interfaces in games.

Figure 10:
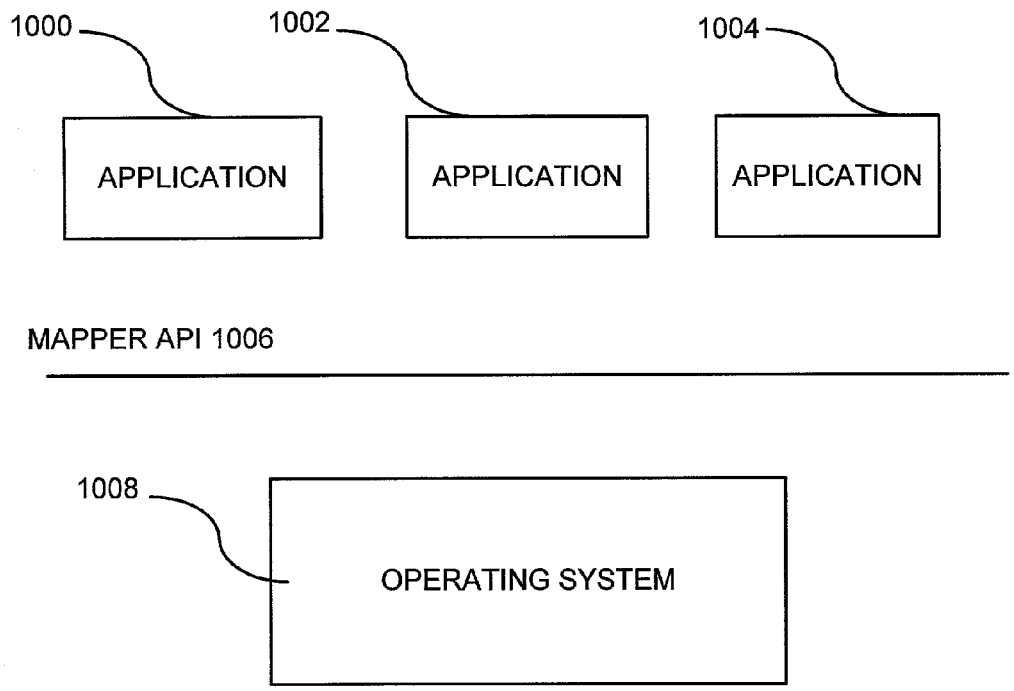
FIG. 10 is a system diagram showing the Mapper API as an interface to expose operating system resources.

FIG. 10 is a diagram showing concurrently executing applications 1000, 1002, and 1004 in the computer system 20. The Mapper API 1006 is a set of routines that the application programs use to request and carry out lower-level services performed by the operating system 1008 running on the computer system 20. For example, the applications invoke methods in the Mapper API to obtain information about input devices connected to the computer system 20 and to configure the system for interactions between the input device and the applications. The Mapper API may use default action-to-control mapping files and device images provided by Independent Hardware Vendors (IHV). The Mapper is currently implemented in DirectX 8.0, which is available from Microsoft Corporation®.

Figure 11:
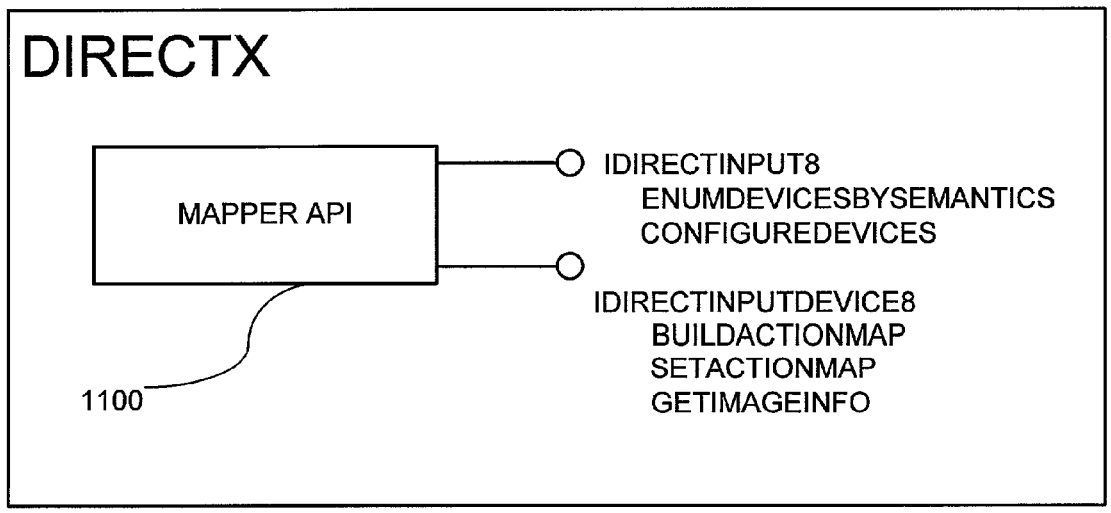
FIG. 11 is a diagram showing the Mapper API methods according to the invention.

FIG. 11 shows that DirectX includes interfaces and methods associated with those interfaces for linking controls on the input devices with actions that the applications perform. Two interfaces are shown: IDirectInput8 and IDirectInputDevice8. IDirectInput8 includes two methods called EnumDevicesBySemantics and ConfigureDevices. As described more fully below, EnumDevicesBySemantics determines the input devices connected to the computer system 20 that most closely match the actions of the application. Based on results, EnumDevicesBySemantics provides a ranking of the input devices to the application. ConfigureDevices invokes a user interface that allows the user to customize mapping of input device controls to actions of the application.

IDirectInputDevice8 has three methods called BuildActionMap, SetActionMap, and GetImageInfo. BuildActionMap is used to create an association between game actions and device controls. SetActionMap sets the action-to-control map in accordance with the association created in BuildActionMap. GetImageInfo allows applications to customize the user interface displayed for configuring the devices.

Details of Mapper API

Mapper Extensions

DirectInput for DirectX 8.0 includes two new interfaces: IDirectInput8 and IDirectInputDevice8. These interfaces do not extend their predecessors, but extends their features to include methods that support the action-to-control mapping features that make up the DirectInput Semantic Mapper. The Mapper simplifies application development by presenting a unified mechanism to tie game actions to device controls. It allows games to take full advantage of devices that come to market, even after the game has shipped.

The game-action-to-device-control mappings made possible by the Mapper are not immutable; that is, applications can override the suggested mappings with their own. Applications that do not use the Mapper to enable users to reconfigure devices (games with finely tuned keyboard mappings, for instance) can still benefit from a simplified input loop made possible by generalizing device input from in-game actions. Additionally, these applications can use the Mapper's companion Device Configuration user interface in "view mode" to display the current configuration without necessarily allowing changes to be made.

An action expresses what application behavior should result from the user's operation of a control. A genre defines a set of actions that are common to most games of that general type. The Mapper takes into account user preferences and information from the device manufacturer to determine the association between an action and a given device control. The Mapper provides a consistent mechanism for games to configure their input.

Market Justification

Entertainment software in today's market encompasses dozens, if not hundreds, of clearly distinguishable genres—first-person shooters, vehicle racing games, flying and combat simulations, sports titles, adventure games, and RPGs are just a few. There are any number of possible "hybrid" games that mix genres for various parts of gameplay.

Actions that users perform in a given game genre are often ubiquitous to that genre. Take a car racing game, for instance. Almost all racing games include common actions: steer, accelerate, brake, upshift, downshift, etc. The same can be said of most all games in most all genres.

Currently, software developers translate raw device data into meaningful game actions, which often represents a significant portion of a game's input loop, or uses a custom input front-end. The DirectInput Mapper serves to decrease the ISV's development overhead by simplifying the input loop and offloading input-data-to-game-action translation onto DirectInput. The Mapper also includes support in the OS for a default device configuration UI, eliminating the need for ad hoc code in each title. API elements exist for ISVs to develop their own UI, if the default UI does not fit within the context of the title. When the Mapper is employed by ISVs and IHVs, title development will be easier and, most importantly, the user experience will be more consistent and reliable.

Example: Race Car Simulator

The following example illustrates how a car racing game may be used by the Mapper to configure input. The enumeration provided by the application developer, called eGameActions, supplies codes that DirectInput uses to communicate the state of controls. The values defined by eGameActions abstract the device controls, so the same input loop can be used for all configured input devices. The game's input loop need only implement a switch that modifies the behavior of the game based on the actions it receives, without concern about the device that provides the control for the action. More capable devices that come to market after the game shipped can enable additional game actions merely by being capable of accommodating more actions, without any modification.

An application may enumerate all the actions that it plans to expose to users. Actions that may use axis and hat-switch controls should also have button or key equivalents, which allows users to configure those actions on less capable devices. The following is a sample enumeration that might be defined by a car racing title.

```
enum eGameActions{
    // "eA_" designates an axis, "eB_" is for a button
    eA_STEER,              // Steering
    eB_STEER_LEFT,         // Use button to steer to the left
    eB_STEER_RIGHT,        // Use button to steer to the right
    eA_ACCELERATE,         // Accelerate
    eB_ACCELERATE,         // Use button to accelerate
    eB_DECELERATE,         // Use button to decelerate
    eA_BRAKE,              // Brake
    eB_BRAKE,              // Brake button
    eB_UPSHIFT,            // Shift to higher gear
    eB_DOWNSHIFT,          // Shift to lower gear
    eB_CYCLEVIEW,          // Cycle to next view
    eB_CONFIGCAR,          // Configure vehicle
    eB_COURSEVIEW,         // Toggle course view
    eB_DRIVERVIEW,         // View from Drivers seat
    eA_VOLUME,             // Music volume
    eB_MUTE,               // Mute music
    eB_BRAKEBIAS,          // Brake Bias
    eMAX_MY_ACTIONS
};
```

Applications bind the actions they support to the semantics in a given genre by using an array of DIACTION structures. Each structure in the array defines an application-defined action value, the pre-defined genre action semantic it applies to, and data that can be used to present a friendly name that describes the action. The DIACTION array serves two purposes: it is used to request a list (via a callback function) of connected devices known to DirectInput that match the desired actions closely, and to retrieve and set the mappings within a chosen device. The array of DIACTION structures is wrapped into a header structure, DIACTION-FORMAT, for all transactions between the application and DirectInput (DIACTIONFORMAT is discussed below).

In the following example, rgActions is an application-defined array of DIACTION structures that binds game action codes to devices and controls on those devices.

is developed. Note that for standard devices such as the keyboard or mouse, physical mappings are provided. This allows developers to closely control the mapping of actions to known standard devices.

An application initially passes its rgActions array (or its equivalent array of DIACTION structures) to DirectInput by way of the IDirectInput8::EnumDevicesBySemantics method.

As stated previously, the DIACTIONFORMAT structure serves as the carrier for an application's DIACTION array (in this example, it is rgActions). With the action array

```
DIACTION rgActions [] =
{
// Genre Defined controls
    /*************       ******************              ***************
        Game Code           Action Code                  Label For Action
    *************          ******************           ***************/
//Genre defined axes
    {eA_STEER,          DIAXIS_DRIVINGR_STEER,          0,  TEXT("Steer"),
    },
    {eA_ACCELERATE,     DIAXIS_DRIVINGR_ACCELERATE,     0,  TEXT("Accelerate"),
    },
    {eA_BRAKE,          DIAXIS_DRIVINGR_BRAKE,          0,  TEXT("Brake"),
    },
//Genre defined buttons
    {eB_UPSHIFT,        DIBUTTON_DRIVINGR_SHIFTUP,      0,  TEXT("Upshift"),
    },
    {eB_DOWNSHIFT,      DIBUTTON_DRIVINGR_SHIFTDOWN,    0,  TEXT("DownShift"),
    },
    {eB_CYCLEVIEW,      DIBUTTON_DRIVINGR_VIEW,         0,  TEXT("Change
View"), },
    {eB_CONFIGCAR,      DIBUTTON_DRIVINGR_MENU,         0,  TEXT("Configure"),
    },
// Additional axes not defined as part of the genre
// Listed in order of importance
    {eA_VOLUME,         DIAXIS_ANY,                     0,  TEXT("CD Volume"),
    },
    {eB_MUTE,           DIBUTTON_ANY,                   0,  TEXT("Mute Volume"),
    },
// . . . More game specific actions
// Additional actions not defined in the car controller genre
// Listed in order of importance.
    {eB_DRIVERVIEW,     DIKEYBOARD_1,       0,  TEXT("Driver View"),    },
    {eB_COURSEVIEW,     DIKEYBOARD_C,       0,  TEXT("Course View"),    },
    {eB_BRAKEBIAS,      DIKEYBOARD_B,       0,  TEXT("Brake Bias"),     },
// . . . More game specific actions.
// Equivalent mapping for keyboard
    {eB_STEER_L,        DIKEYBOARD_LEFT,    0,  TEXT("Steer Left"),     },
    {eB_STEER_R,        DIKEYBOARD_RIGHT,   0,  TEXT("Steer Right"),    },
    {eB_ACCEL_MORE,     DIKEYBOARD_UP,      0,  TEXT("Accelerate"),     },
    {eB_ACCEL_LESS,     DIKEYBOARD_DOWN,    0,  TEXT("Decelerate"),     },
    {eB_BRAKE,          DIKEYBOARD_END,     0,  TEXT("Brake"),          },
// . . . Additional mapping for keyboard
// Equivalent mouse mapping
    {eB_UPSHIFT1,       DIMOUSE_BUTTON0,    0,  TEXT("UpShift"),        },
    {eB_DOWNSHIFT1,     DIMOUSE_BUTTON1,    0,  TEXT("DownShift"),      },
    {eB_CYCLEVIEW,      DIMOUSE_WHEEL,      0,  TEXT("Cylce View"),     },
// . . . Additional mapping for mouse
```

The rgActions array specifies a template for associations between game actions and device controls. Device controls can be specified either on gaming devices or keyboard/mouse. Actions on gaming devices are mapped with the help of information from user preferences and device manufacturer provided mappings. For standard devices (keyboard, mouse) or specific devices whose layout is well known the controls may be specified by direct reference. If the application permits, a user can re-map keyboard/mouse controls to some other device(s).

Genre semantics provide a way to map actions to controls on custom gaming devices, even if released after the game defined, the application can build an appropriate DIACTIONFORMAT structure to act as the carrier for its rgActions array. This structure is a simple wrapper for the application's array of DIACTION structures. The application can choose to specify a default data axis range as a member of the DIACTIONFORMAT. This default range will apply to all configured devices. For example, a game may prefer all input axes to report data in the range of {−100, +100}, with 0x0 as the nominal center. The range for individual actions can still be configured through the SetProperty method. The following example initializes a DIACTIONFORMAT structure for the rgActions array.

```
DIACTIONFORMAT g_diActionDf =
{
    sizeof(DIACTIONFORMAT),
    sizeof(DIACTION),
    // Size of buffer for immediate device data.
    eMAX_MY_ACTIONS *
    sizeof( ((LPDIDEVICEOBJECTDATA)0) ->dwData ),
    eMAX_MY_ACTIONS,
    rgActions,
    GUID_Application,
    DIVIRTUAL_CARCONTROLLER,
    16,
    L_AXIS_MIN,
    L_AXIS_MAX,
    NULL,
    0,
    0,
    TEXT("Racing Controls")
};
```

The dwDataSize member represents the size, in bytes, of the device data buffer that should be returned for by the device for immediate data retrieval. (However, most applications will usually use buffered device data.) Applications should set this member to the value in dwNumActions multiplied by four.

Given a prepared DIACTIONFORMAT structure, the application can enumerate the connected devices that match the actions it needs by calling IDirectInput8::EnumDevicesBySemantics, as in the following example.

```
InitializeInput( )
{
    HRRESULT hr;
    IDirectInput8* pDI = NULL;
    // Create DirectInput interface
    hr = DirectInputCreateEx(
        g_hinst, DIRECTINPUT_VERSION,
        &IID_DirectInput8, (void**)pDi, NULL);
    if(FAILED (hr)) {
        goto panic;
    }
    // Enumerate devices for my actions.
    hr =pDI->EnumDevicesBySemantics(
        TEXT("1UP"),        // UserName, NULL=>CurrentUser
        &g_diActionDf,      // Action data format
        fnDIEnumDevices,    // Device Enumeration function
        NULL,               // User variable
        0x0);               // Enumeration flags
    if(FAILED (hr))
    {   // No devices were found.
        goto panic;
    }
panic:
    if (pDI)
        pDI->Release( );
}
```

When the application calls IDirectInput8::EnumDevicesBySemantics, DirectInput examines all connected devices and invokes an application-defined callback function to enumerate the connected devices that match the desired game actions most closely. In the callback function, the game can build a list of available devices and allow the user to configure each device. The following represents a typical callback function.

```
BOOL fnDIEnumDevices(
    LPCDIDEVICEINSTANCE lpDIdi,
    LPDIRECTINPUTDEVICE8 lpDiDev,
    DWORD dwFlags,
    DWORD dwDevicesRemaining,    // The number of devices,
after this one, left to be enumerated.
    PVOID pContext)
{
    LPBOOL lpB = (BOOL*)pContext;
    BOOL bIsSystemDev = (lpDIdi->dwDevType &
(DIDEVTYPE_MOUSE|DIDEVTYPE_KEYBOARD));
    BOOL bRecent = (dwFlags & DIEBS_RECENTDEVICE);
    BOOL bNew    = (dwFlags & DIEBS_NEWDEVICE);
    // If there are no recent devices, this could be the very first time
    // the application is being run, and it may want to prompt the user
    // to choose a device. Also, apps may want to cue the user to
    // select a device if a new device is found.
    if( !Recent || bNew )
        *lpB = TRUE;
    // If the device has had an action map applied recently, assume that
    // the user is actively using the device. Also prepare all system
devices,
    // such as the mouse or keyboard.
    if( bIsSystemDev || TRUE == *lpB)
    {
        // Obtain the action to device control mapping.
        hr = lpDiDev->BuildActionMap(&g_diActionDf,
            lptszUserName,
DIDBAM_DEFAULT);
        // Once actions have been mapped to the device controls the
        // application can review the mapping and may want to modify the
map.
        // .
        // .
        // .
        hr = lpDiDev->SetActionMap(&g_diActionDf, lptszUserName,
DIDSAM_DEFAULT);
        // If you decide to keep the device, you need to AddRef( )
        // the interface.
        lpDiDev->AddRef( );
        // Set the cooperative level for device access.
        lpDiDev->SetCooperativeLevel (. . .);
        // Save the interface pointer
        g_1lpDiDevices[g_nDevices++] = lpDiDev;
    }
    // Look for other devices
    return DIENUM_CONTINUE;
}
```

Note that mappings for the enumerated devices may not exactly match the action array provided by the application; applications can query an enumerated device for its mappings by way of IDirectInputDevice8::BuildActionMap, change them, then commit them to the device by calling IDirectInputDevice8::SetActionMap. If the settings for the device have changed (verified through a CRC check), DirectInput automatically persists them to disk.

With the Mapper properly prepared, the input loop for the game is considerably simplified. The application need not try to parse incoming device data; it gets its own action values. (Applications can even use function pointers as action values.) The following example shows a for loop that runs through all configured devices, polls them, obtains data from each, and takes action in a switch statement based on the action.

```
// For all configured input devices
for(iDevice= 0x0; iDevice < g_nDevices; iDevice++)
{
    DIDEVICEOBJECTDATA didod;
    HRESULT hr;
    DWORD dwObjCount = 1;
```

-continued

```
    // Some devices are polled, others are interrupt-driven. The Poll
method
    // quickly returns S_FALSE on interrupt-driven devices.
    g_lpDiDevices[iDevice]->Poll( );
    // Get device data
    hr = g_lpDiDevices [iDevice]->GetDeviceData( sizeof (didod),
                                                 &didod,
                                                 &dwObjCount, 0 );
    if(FAILED(hr)) goto Panic;
    // Switch based on the uAppData field in the DIDEVICEDATA field
    // No dependency on input device
    switch(didod.uAppData)
    {
        case eA_STEER:
            SteerCar(dwData);
            break;
        case eA_BRAKE:
            Decelerate(dwData);
            break;
        .
        .
        .
        default:
            break;
    }
}
```

Low-level UI API

DirectInput also supports a low-level API to retrieve the same data used to display the default user interface. This data provides the application with access to the device images, overlays, callout lines and callout text rectangles. The IDirectInputDevice8 interface provides a new method for this purpose—IDirectInputDevice8::GetImageInfo—and two related structures. The low-level API does not impose a UI paradigm on the application developer; it simply provides the lowest-level data access possible, from which a custom UI can be developed.

The IDirectInputDevice8::GetImageInfo method returns general information that might be needed to display the user interface (in the form of a DIDEVICEIMAGEINFO-HEADER structure):

(a) Images. The total number of images, including the device selection view, alternate mini-view images, the configuration views, and all overlays.

(b) Views. The total number of device configuration images for this device.

(c) Buttons. The count of buttons for the device.

(d) Axes. The count of axes for the device.

The DIDEVICEIMAGEINFOHEADER contains a pointer to an array of DIDEVICEIMAGEINFO structures, which provide data needed to display images, callouts, and labels.

(a) Image path. The fully qualified path to the device image file.

(b) Image file format. Describes the file format of the device image. For DirectX 8.0, the only publicly supported format is PNG, 384×320, with alpha. Dimensions are not arbitrary; they were chosen because to be easily split into square, power-of-2 textures, to accommodate the widest variety of display cards. For example, 384×320=(256+128)×(256+64), which can be done with one 256×256 texture, two 128×128 textures, and six 64×64 textures for a total of 9 textures when there is a square power-of-2 surface limitation. Parts without this limitation require fewer sections.

(c) Image type. Describes the purpose of the image (device configuration, selection, etc.)

The following information is also included in the structure, but is only valid for device controls (usually overlays).

(d) View ID. The zero-based ID of the base image over which an overlay is to be displayed.

(e) Overlay rectangle. The rectangle, relative to the top-left corner of the base image, where the overlay should appear.

(f) Object ID. The object ID (for instance, DIJOFS_X) of the control on the device to which this overlay applies.

(g) Callout line. The one- to four-segment line for the callout.

(f) Callout rectangle. The rectangle in which the action string should be displayed.

(i) Text alignment. Left-justified, centered, or right justified. Required to properly display text within callout rectangles that could be above, below, left, or right of the endpoint of the callout line.

An application can call the IDirectInputDevice8::GetImageInfo method once for each device, passing 0 in the dwBufferSize member, which causes the method to simply calculate the required size and return that value in the dwBufferUsed member. This value is used by the application developer to determine how many DIDEVICEIMAGE structures to allocate in an array, which is contained by the DIDEVICEIMAGEINFOHEADER structure. Other information in the structure is provided mainly for convenience. After the array is allocated, the application can call IDirectInputDevice8::GetImageInfo.

The following example shows how this might look in code:

```
DIDEVICEIMAGEINFOHEADER diImgInfoHdr;
LPDIDEVICEIMAGEINFO lprgdiImgData;
ZeroMemory( &diImgInfoHdr,
sizeof(DIDEVICEIMAGEINFOHEADER) );
diImgInfoHdr.dwSize = sizeof(DIDEVICEIMAGEHEADER);
// Retrieve the required buffer size.
lpDIDev->GetImageInfo( &diImgInfoHdr );
// Allocate the buffer.
lprgdiImgData = (LPDIDEVICEIMAGEINFO) malloc( (size_t)
diImgInfoHdr.dwBufferUsed );
diIDHeader.lprgImageDataArray = lprgdiImgData;
// Get the display info.
lpDIDev->GetImageInfoi ( &diImgInfoHdr );
```

Exactly how the application uses the information to create a user interface is not within the scope of this specification. The developer is free to produce their own UI paradigm (tabbed, wizard-like, 3D, etc.).

Semantic Mapper API

Interfaces

EnumDevicesBySemantics

Figure 13:
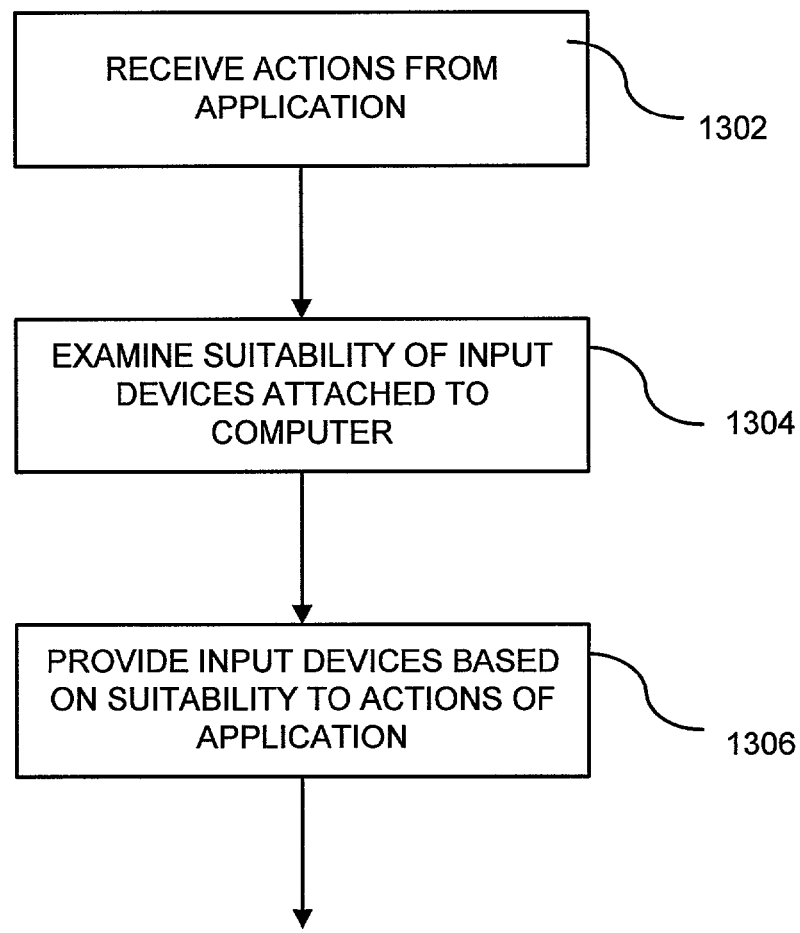
FIG. 13 is a flowchart of a method for determining the most suitable input devices to use with an application.

FIG. 13 is a flowchart of a method for implementing IDirectInput8::EnumDevicesBySemantics. This method examines the genre specified by the application and enumerates devices that most closely match.

In process box 1302, the API receives actions from the application. For example, the actions may be passed in an action array, such as contained in the DIACTIONFORMAT structure (described further below). Other techniques for passing the actions to the API may also be used.

In process box 1304, the API examines input devices attached to the computer. For example, the API may determine the keyboard and a SideWinder Game Pad Pro are attached to the computer system 20.

In process box 1306, the API provides the input devices to the application based on how suitable the input devices are to the application. Thus the API analyzes how many of the semantics of the C-S correlations 221 (FIG. 3) match the semantics of the A-S correlations 231 (FIG. 4). The input devices can be provided in a list, table, array, etc. Alternatively, the API can invoke an application-defined callback function that returns the ranking through repeated calls to the application.

The application uses the information from the API to select an input device. The information is only suggestive. The application can ignore the suggested information from the API and choose the input device that the application believes is optimal.

A specific implementation of EnumDevicesBySemantics is shown below. In examining available devices, DirectInput uses information about current user preferences and hardware manufacturer provided action maps.

```
HRESULT IDirectInput8::EnumDeviceSBySemantics(
    LPTSTR                    ptszUserName,
    LPDIACTIONFORMAT          pdiActionFormat,
    LPDIENUMDEVICESBYSEMANTICSCB  pcallback,
    LPVOID                    pAppData,
    DWORD                     dwFlags);
``` ptszUserName is a string identifying the user name. Passing NULL is valid, indicating the user currently logged-in to the system. The user name is taken into account when enumerating devices. A device with user mappings is preferable to a device without any user mappings. Devices in use by other users will not be enumerated for this user (by default, see flags).

pdiActionFormat is a pointer to a DIACTIONFORMAT structure that contains the action map array for which suitable devices will be enumerated.

pcallback is a pointer to a callback function (of prototype LPDIENUMDEVICESBYSEMANTICSCB) to be called once for each device enumerated.

pAppData is an Application-defined 32-bit value to be passed to the enumeration callback each time it is called.

dwFlags includes flags that specify the scope of the enumeration. This parameter can be one or more of the following values:

DIEDBSFL_AVAILABLEDEVICES

Only unowned installed devices are enumerated.

DIEDBSFL_THISUSER

All installed devices for the user identified by ptszUserName are enumerated.

DIEDBSFL_ATTACHEDONLY

Only attached and installed devices. If the DIEDBSFL_THISUSER flag is also present, the method will enumerate all devices owned by the user name at ptszUserName, and all unowned attached devices.

DIEDBSFL_FORCEFEEDBACK

Only devices that support force feedback.

DIEDBSFL_MULTIMICEKEYBOARDS

Only secondary (non-system) keyboard and mouse devices.

DIEDBSFL_NONGAMINGDEVICES

Only HID-compliant devices whose primary purpose is not as a gaming device. Devices such as USB speakers, multimedia buttons on some keyboards, and such are within this category.

EnumDevicesBySemantics may return the following error codes, though other standard COM or DirectInput error codes may be returned:

DI_OK

DIERR_INVALIDPARAMS

DIERR_NOTINITIALIZED

ConfigureDevices

Figure 14:
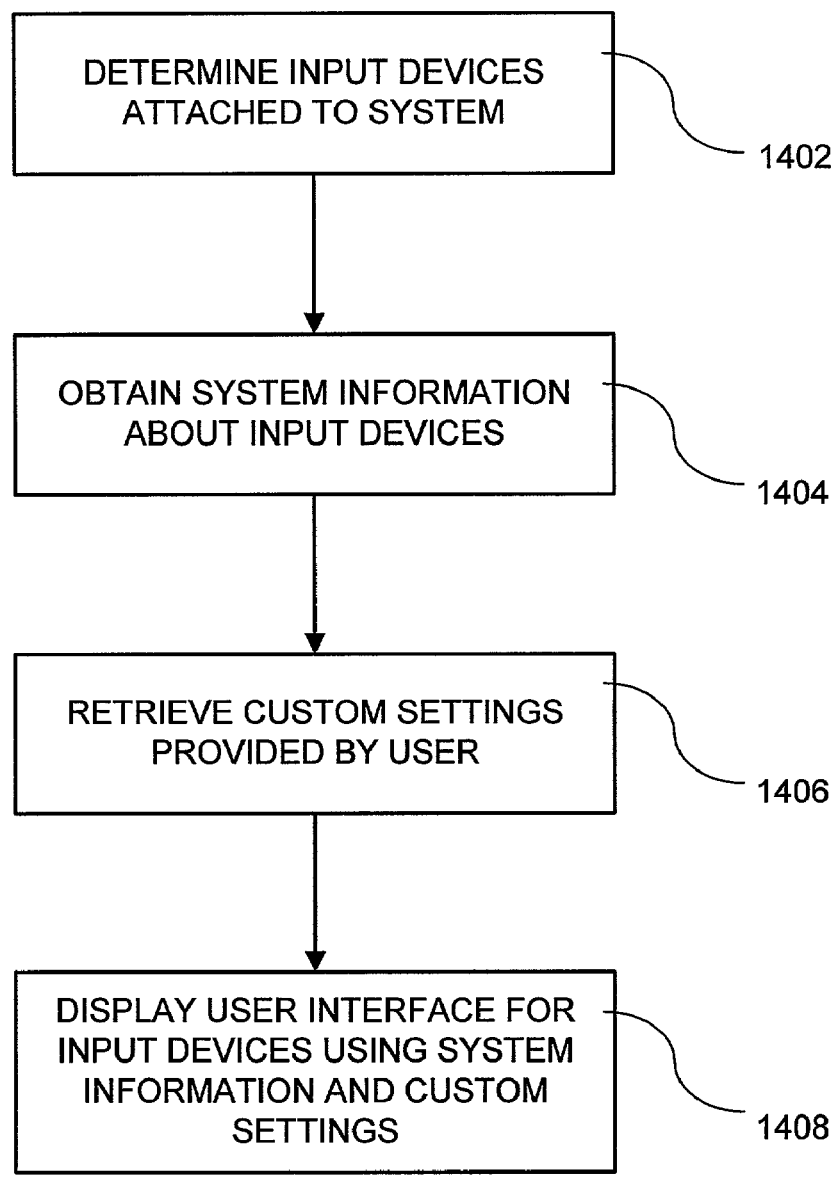
FIG. 14 is a flowchart of a method for configuring the user interface.

FIG. 14 is a flowchart of a method for configuring the UI. In process box 1402, IDirectInput8::ConfigureDevices determines the input devices that are attached to the system, which is well understood in the art. In process box 1404, ConfigureDevices obtains system information about the input devices stored on the computer system. For example, IHVs may supply information in the form of .ini files that describe buttons, levers, etc. on the input device. Additionally, information about how to display the UI is obtained, such as where to display text on the UI, where to draw lines extending from the text to a control on the input device, etc. In process box 1406, ConfigureDevices retrieves custom settings that the user has set for this device. Such custom settings are also stored on the computer system 20. In process box 1408, the UI is displayed to the user using the information obtained from the system and the custom settings. ConfigureDevices can either render the UI directly by placing the rendering information in a screen buffer or can pass the rendering information back to the application.

A specific implementation of ConfigureDevices is now described. IDirectInput8::ConfigureDevices invokes the default DirectInput configuration (Mapper) user-interface. Calls to this method are synchronous.

```
HRESULT IDirectInput8::ConfigureDevices(
    LPDICONFIGUREDEVICESCALLBACK  lpdiCallback,
    LPDICONFIGUREDEVICESPARAMS    lpdiCDParams,
    DWORD                         dwFlags,
    LPVOID                        pvRefData);
``` lpdiCallback

Pointer to the ConfigureDevicesCallback function for the application. This can be NULL to cause DirectInput to display the UI (windowed-mode applications only). If a callback function is specified, the UI is not displayed by DirectInput. Rather, the UI is placed into the target surface provided within the DICONFIGUREDEVICESPARAMS structure, and the callback function is invoked.

lpdiCDParams

Address of a DICONFIGUREDEVICESPARAMS structure that contains information about users and genres for the game, as well as data controlling in part how the UI is displayed.

dwFlags

Flags specifying the mode in which the control panel should be invoked. This parameter can be one of the following values.

DICD_DEFAULT

Open the control panel in view mode, the default setting. While in view mode, the control panel acts simply to display the current device configuration.

DICD_EDIT

Open the control panel in edit mode. This mode allows the user to change action-to-control mappings through the control panel. After the call returns, the application should assume current devices are no longer valid used, release all device interfaces and reinitialize them through enumeration (IDirectInput8::EnumDevicesBySemantics).

pvRefData

Application-defined value to be passed to the callback function.

This method can return the following error codes, though other standard COM or DirectInput error codes may be returned:

DI_OK

DIERR_INVALIDPARAMS

DIERR_OUTOFMEMORY

Hardware vendors provide bitmaps and other display information for their device.

Prior to invoking ConfigureDevices, application developers can modify the text labels associated with each action in the DIACTION structure to accurately reflect the context within the game.

Users can set up the configuration for each connected device, the configuration information is stored on a per-game and per-user basis. The application GUID and user name are used to store unique configuration information, which can be retrieved by the IDirectInputDevice8::BuildActionMap method.

After the method returns from edit mode, applications should assume that mappings have changed. They should subsequently destroy and re-create their input devices (getting the new mappings).

IDirectInputDevice8 is another interface having three methods each discussed in turn below: BuildActionMap, SetActionMap, and GetImageInfo.

BuildActionMap

Figure 15:
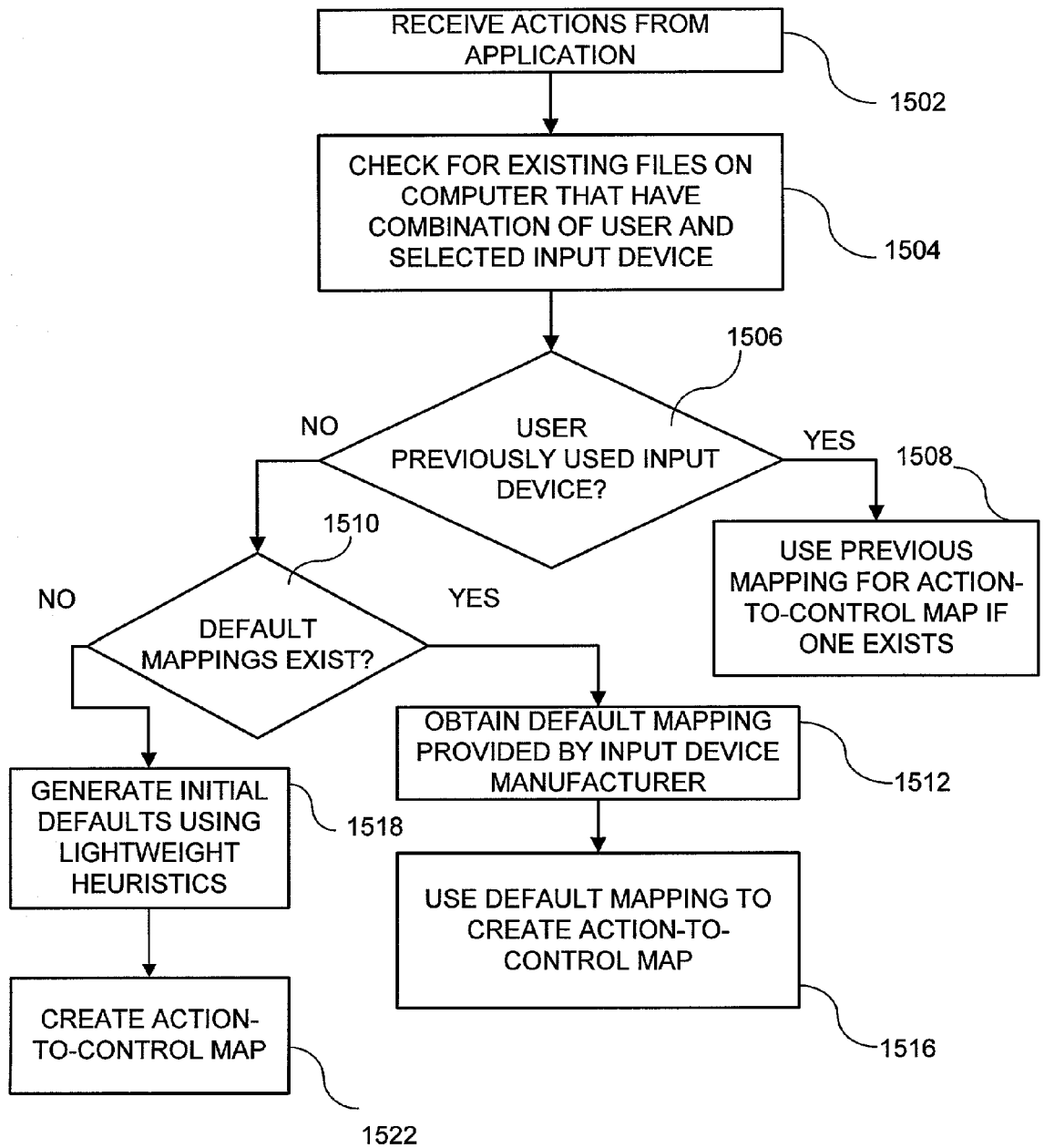
FIG. 15 is a flowchart of a method for building a control-to-action mapping for a selected input device.

FIG. 15 shows a flowchart of a method for implementing BuildActionMap. BuildActionMap creates the mapping of actions to controls for the selected input device. Information about user preferences and hardware manufacturer provided defaults is used to create the association between game actions and device controls.

In process box 1502, the API receives the actions that the application needs to implement (e.g., steering, braking, etc.). In process box 1504, a check is performed for a file that identifies input devices previously used by the user and the associated settings the user had for that device. In decision box 1506, if such a file exists, then the user's previous configurations are used for the action-to-control map (process box 1508). If such a file is not found (or if the file does not include the desired configuration information), then alternate steps are needed to generate the action-to-control mapping. In decision box 1510, a check is made whether a default mapping exists. If decision box 1510 is answered in the affirmative, then in process box 1512, the default mappings are obtained. Such default mappings are stored in a file provided by the hardware vendor that indicates the different applications and action-to-control map for the applications. In process box 1514, the default mappings are used to create the action-to-control map.

If default mappings do not exist, then initial defaults are generated using lightweight heuristics (process box 1518). Finally, in process box 1522, the generated defaults are used to create the action-to-control map.

A specific implementation for BuildActionMap is as follows:

```
IDirectInputDevice8::BuildActionMap(
    LPDIACTIONFORMAT lpdiActionFormat,
    LPCSTR lptszUserName,
    DWORD dwFlags);
``` lpdiActionFormat

Pointer to a DIACTIONFORMAT structure that will receive the control-to-action mapping for this device.

lptszUserName

String specifying the user's name. The name is used to retrieve preferences on a per-user basis. Passing NULL is valid, indicating current user.

dwFlags

Mapping control flags. This parameter can be one of the following flags.

DIDBAM_DEFAULT

Retrieve action-to-control mappings for this device, overwriting all mappings except application-specified mappings (DIA_APPMAPPED).

DIDBAM_INITIALIZE

Retrieve action-to-control mappings for this device, overwriting all mappings, including application-specified mappings (DIA_APPMAPPED).

DIDBAM_HWDEFAULTS

Retrieve action-to-control mappings for this device, overwriting all mappings, including application-specified mappings (DIA_APPMAPPED). This flag is similar to DIDBAM_INITIALIZE, but automatically overrides user-mapped actions with the IHV/DirectInput defaults.

DIDBAM_PRESERVE

Retrieve action-to-control mapping, preserving any currently set mappings assigned for this device or any other configured device.

This method can return the following error codes, though other standard COM or DirectInput error codes may be returned:

DI_OK

DI_SETTINGSNOTSAVED

The action map was applied to the device, but the settings could not be persisted.

DIERR_INVALIDPARAMS

One of the mappings in the action-to-control map was not valid. The entry was marked DIAH_ERROR. The application can iterate through the action map to find and correct the error.

If this method fails when using the DIDGAM_DEFAULT flag, the retrieved action-to-control mappings should be assumed incomplete. The application should check for and eliminate invalid values present in the dwHow members of the associated DIACTION structures, then call the method again.

SetActionMap

Figure 16:
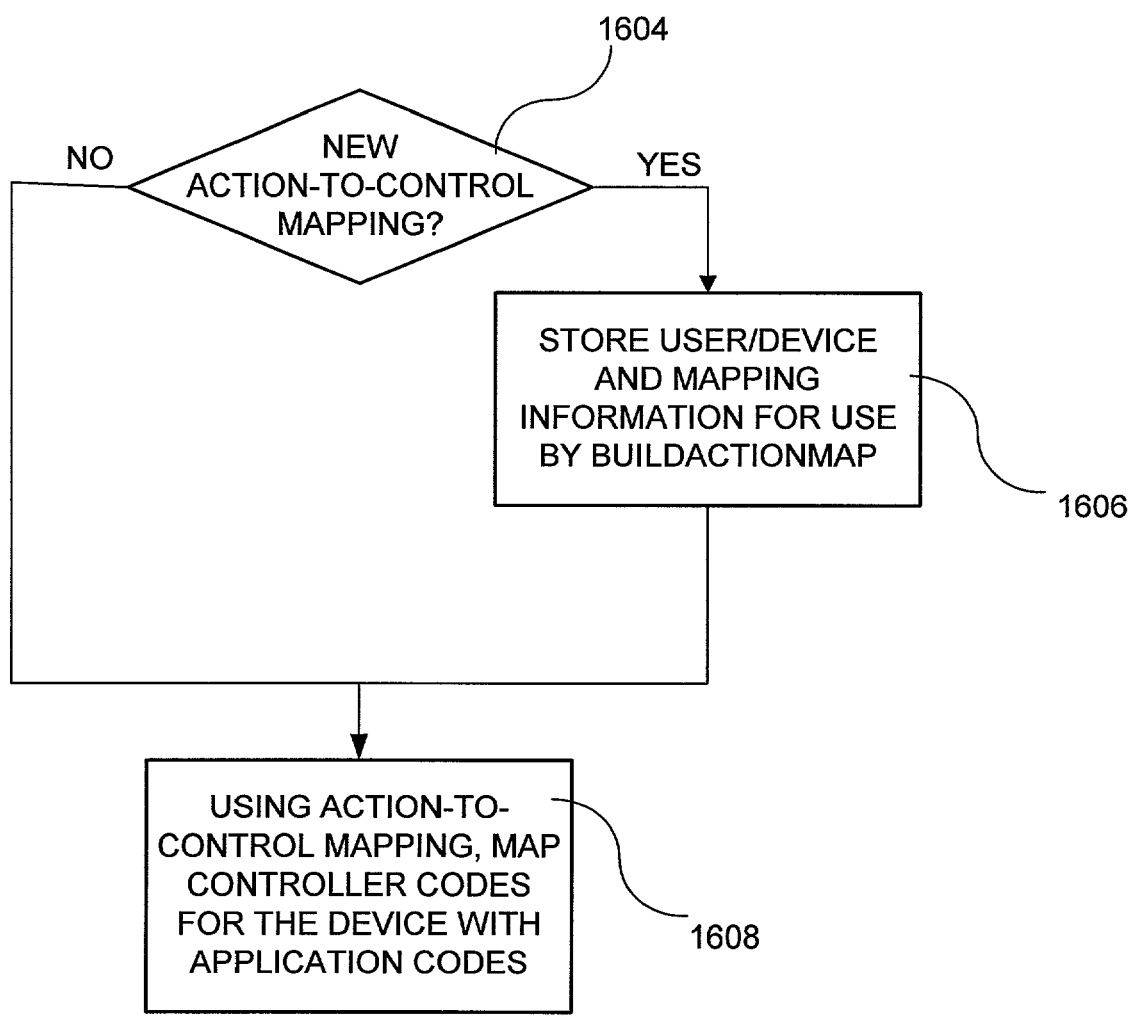
FIG. 16 is a flowchart of a method for setting the action map subsequent to building.

FIG. 16 illustrates DirectInputDevice8::SetActionMap. SetActionMap sets the action-to-control map for this device/user combination, saving settings to disk if this is a new action-to-control map for the user. A distinction that should be recognized between the physical device codes received from an input device and generic semantic associated with that code. For example, a generic semantic could be "fire guns." However, if the user activates the user input device to fire guns, the API may receive a controller code 1002, which is an indication to fire guns. The application, on the other hand, expects "fire guns" to be application code "64379." BuildActionMap creates an association for the generic semantics. Once BuildActionMap creates the generic action mapping, SetActionMap completes the actual control-to-action mapping by ensuring that the controller codes are mapped to the associated application codes. Thus, the results of BuildActionMap are used to set the action-to-control map to bind the marriage of the device to the application. At this point, the device can communicate with the application.

In decision box 1604, a check is made to determine whether the action-to-control mapping has previously been saved to disk in its current form. If it has, in process box 1606, the settings are automatically saved to disk. These settings may then be used in BuildActionMap when the same application is used again with the same input device.

In process box 1608, using the action-to-control mapping, the API maps the controller codes for the device with the application codes.

A specific implementation of SetActionMap is as follows:

This method should be called while the device is unacquired.

```
IDirectInputDevice8::SetActionMap(
    LPDIACTIONFORMAT lpdiActionFormat,
    LPCSTR lptszUserName,
    DWORD dwFlags
);
``` lpdiActionFormat
　Pointer the DIACTIONFORMAT structure containing the action-to-control mapping data to be set for this device.

lptszUserName
　Name of the user for which the action map is to be set. NULL is valid for the user currently logged-into the system.

dwFlags
　Application control flags.
　DIDSAM_DEFAULT
　　Set the action-to-control map for this user. If the map differs from the currently set map, the new settings are saved to disk.
　DIDSAM_FORCESAVE
　　Device mappings should be saved even if the device in the default configuration UI should be set to no owner. Resetting user ownership does not remove the currently set action-to-control map.
　DIDSAM_NOUSER
　　(Used only for default UI). Reset user ownership for this device in the default configuration UI. Resetting user ownership does not remove the currently set action-to-control map.

This method can return the following error codes, though other standard COM or DirectInput error codes may be returned:
　DI_OK
　DI_SETTINGSNOTSAVED
　　The settings have been successfully applied but could not be persisted;
　DIERR_INVALIDPARAM
　　Invalid parameter was passed.
　DIERR_ACQUIRED
　　Settings cannot be saved while a device is acquired.

This method provides the mechanism to change action to control mapping from the device defaults. An application must use this method to map its in-game actions to device control semantics.

The user name passed to this method binds a set of action-to-control mappings for a device to a specific user. Settings are automatically saved to disk when they differ with the currently applied map, however device ownership is not persisted to disk. Applications that accept input from multiple users should be very careful when applying action maps to system devices (GUID_SysMouse, GUID_SysKeyboard), as the action maps for each user may conflict.

GetImageInfo

Figure 17:
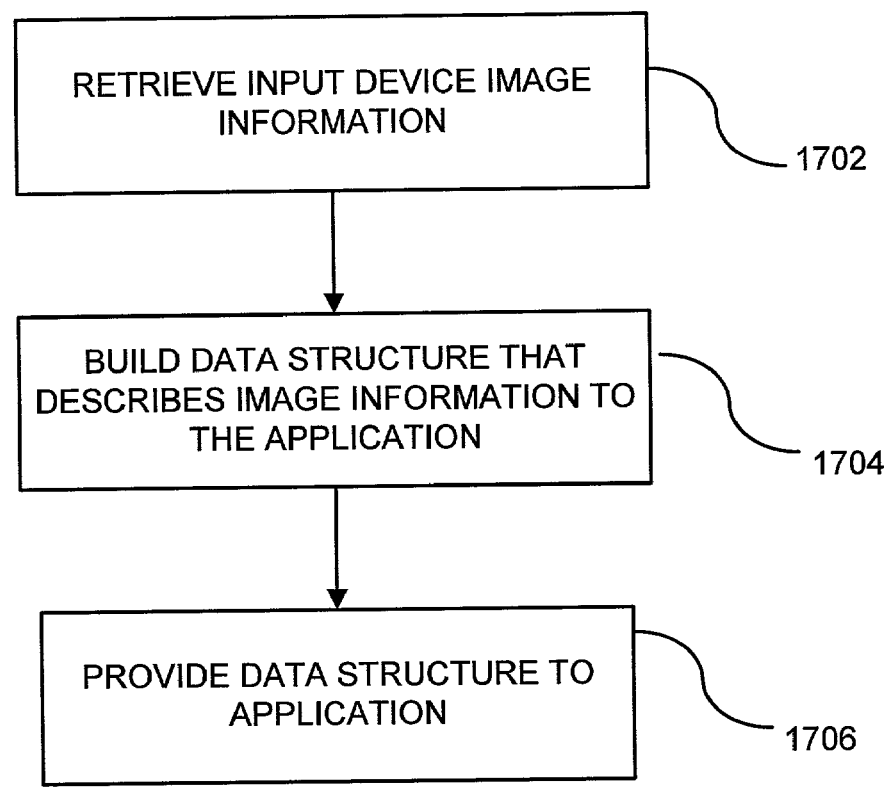
FIG. 17 is a flowchart of a method for allowing applications to configure the user interface.

FIG. 17 shows a flowchart of a method for GetImageInfo, which retrieves device image information for use in displaying a configuration UI for a single device.

In process box 1702, the input device image information is retrieved. The retrieved information is provided by an IHV and includes recommended rendering information, such as how to draw lines and where text should be placed in the UI of the input device. In process box 1704, the API builds a data structure that describes the image information to the application so that the application can customize the UI. In process box 1706, the API provides the data structure to the application. A specific implementation of GetImageInfo is as follows:

```
HRESULT IDirectInputDevice8::GetImageInfo(
    LPDIDEVICEIMAGEINFOHEADER lpdiDevImageInfoHeader
);
``` lpdiDevImageInfoHeader
　Pointer to a DIDEVICEIMAGEINFOHEADER structure that will receive image information that can be used to display custom configuration user interface.

This method can return the following error codes, though other standard COM or DirectInput error codes may be returned:
　DIERR_INVALIDPARAMS
　　The parameter lpdiDevImageInfoHeader is invalid, or the contents of the structure it points to are invalid.
　DIERR_NOTINITIALIZED
　　The object is not initialized.

If the dwBufferSize member of the DIDEVICEIMAGEINFOHEADER structure is set to zero, this method computes the minimum size, in bytes, of the buffer placing the value in the dwBufferUsed member.

Not all devices will have image information. If no image is available for the device, the tszImagePath member of the DIDEVICEIMAGEINFO structure will be set to NULL. If so, the application is responsible for enumerating controls on the device and displaying a default listing of actions to device controls (similar to the method used by most applications before DirectX 8.0).

Structures

The DIACTION structure forms the basis for the Mapper. Its members carry data to describe a mapping of one game action to one device semantic. The structure is used by IDirectInput8::EnumDevicesBySemantics to examine the input requirements and enumerate suitable devices, by IDirectInputDevice8::BuildActionMap to resolve virtual device controls to physical device controls, and by IDirectInputDevice8::SetActionMap to set the action map for a device.

```
typedef struct _DIACTION{
    UINT_PTR            uAppData;
    DWORD               dwSemantic;
    DWORD               dwFlags;
    union {
        LPCTSZ          lptszActionName;
        OPTIONAL UINT     uResIdString;
    } DUMMYUNIONNAMEN(1);
    OPTIONAL GUID       guidInstance;
    OPTIONAL DWORD      dwObjID;
    OUT DWORD           dwHow;
} DIACTION, *LPDIACTION;
``` uAppData
  Application-defined value to be returned to the application by IDirectInputDevice8:GetDeviceData when the state of the control associated with the action changes. This value is returned in the uAppData member of the DIDEVICEOBJECTDATA structure. This is typically an identifier for the application-specific action associated with the device object, but can be a function pointer.

dwSemantic
  For gaming devices, one of the predefined semantics for this application genre. For a mouse or keyboard (DIPHYSICAL_MOUSE or DIPHYSICAL_KEYBOARD), a specific control object on the device.

dwFlags
  Flags used to request specific attributes or processing. Can be 0 or one or more of the following values:
    DIA_FORCEFEEDBACK
      The action must be an actuator or trigger.
    DIA_APPMAPPED
      The dwObjID member is valid.
    DIA_APPNOMAP
      This action is not to be mapped.
    DIA_NORANGE
      The default range is not to be set for this action. This flag can be set only for absolute axis actions.

lptszActionName
  Friendly name associated with the action. This string will be displayed by the Input Configuration control panel to describe the action assigned to a device control. If a resource ID is specified in the wResIDString member, this member is ignored.

uResIdString
  Resource ID for the string for this action. The module instance for this resource is specified in the DIACTIONFORMAT structure that contains this structure. This member is ignored unless the application specified a valid module handle in the hInstString dwObjID
  Control ID. This is specified as a combination of one instance and one type flag. Applications use the DIDFT_GETINSTANCE and DIDFT_GETTYPE macros to decode this value to its constituent parts.

guidInstance
  Optional device instance GUID if a specific device is requested. Usually set to a NULL GUID by the application.

dwHow
  On input, this member is ignored. On output (when used with IDirectInputDevice8::BuildActionMap), this member indicates how the mapping was last achieved. If the mapping was a result of user configuration, device vendor default, device vendor game specific mapping, user specified preference for another game, application requested device, or DirectInput default mapping.
  Receives a value to indicate the actual mapping mechanism used by DirectInput in order to configure the action. The following values are defined:
    DIAH_UNMAPPED
      This action is not mapped to a device control. This could be because the action does not apply to available device controls, or simply because it isn't currently assigned to a control.
    DIAH_USERCONFIG
      This action was mapped to a device control by the user.
    DIAH_APPREQUESTED
      This action was mapped to a device control by the application.
    DIAH_HWAPP
      This action was mapped to a device control by the device manufacturer, for the purpose of serving a particular game.
    DIAH_HWDEFAULT
      This action was mapped to a device control by default, in accordance to the device manufacturer's recommendation to supporting a particular genre.
    DIAH_DEFAULT
      This is the default mapping for the device control. This represents DirectInput's mappings in absence of any other default mapping information.
    DIAH_ERROR
      There was an error attempting to build an action map. This value can be set while calling IDirectInputDevice8::BuildActionMap, when an action cannot be matched to a control on the device (most likely a bad DIAH_APPMAPPED action). On set, actions marked invalid will be ignored.

DIACTIONFORMAT
  The DIACTIONFORMAT structure carries information about the calling application and acts as a container for an array of DIACTION structures that define a set of action-to-control mappings for a genre. This structure is used with the IDirectInputDevice8::BuildActionMap and IDirectInputDevice8::SetActionMap methods.

```
typedef struct _DIACTIONFORMAT {
    DWORD               dwSize;
    DWORD               dwActionSize;
    DWORD               dwDataSize;
    DWORD               dwNumActions;
    LPDIACTION          rgoAction;
    GUID                guidActionMap;
    DWORD               dwGenre;
    DWORD               dwBufferSize;
    OPTIONAL LONG       lAxisMin;   // Relevant only to
                                    absolute axes and
    OPTIONAL LONG       lAxisMax;   // are otherwise ignored.
    OPTIONAL
    HINSTANCE           hInstString;
    FILETIME            ftTimeStamp;
    DWORD               dwCRC;
    TCHAR               tszActionMap[MAX_PATH];
} DIACTIONFORMAT, *LPDIACTIONFORMAT;
``` dwSize
  Size of the DIACTIONFORMAT structure, in bytes.

dwActionSize
   Size of the DIACTION structure, in bytes.

dwDataSize
   The size of the device data that should be returned by the device for immediate device data, in bytes. This member should be dwNumActions multiplied by four.

dwNumActions
   The number of actions in the rgoAction array.

rgoAction
   Array of DIACTION structures, each of which describes how an action maps to a device semantic, and how the mapping information should be displayed to the user.

guidActionMap
   Globally unique identifier (GUI)) that identifies the action map. This enables device manufacturers to tune device mappings for a specific title.

dwGenre
   Genre identifier for this set of action-to-control mappings.

dwBufferSize
   Buffer size to be set for the device. This value is internally set to the DIPROP_BUFFERSIZE property on the device when the action map is applied by using IDirectInputDevice8::SetActionMap. This value is ignored by all other methods.

lAxisMin and lAxisMax
   Minimum and maximum values for range of scaled data to be returned for all axes. These members are only used if DIA_NORANGE is set in dwFlags. The values are currently only valid for axis actions and should be set to zero for all other actions. These values are used as the lMin and lMax values to set the range property on an absolute axis when the action map is applied using IDirectInputDevice8::SetActionMap. These members are only valid for ranges on absolute axes, and are ignored otherwise.

hInstString
   Module handle for the module containing string resources for these actions. When used, the wResIdString members of the enclosed DIACTION structures can identify string resources in favor of explicit strings (specified in DIACTION.lptszActionName).

ftTimeStamp
   Time, reported as a Win32 FILETIME structure, at which this action map was last written to disk.
   Two special times are defined for action maps that apply to new devices and unused devices. New devices are those which have never before been enumerated for this application, and have never had an action map applied to them. Unused devices are those that have been enumerated for the application previously, but have never had an action map applied. New devices always have a timestamp with high and low DWORDs of the FILETIME structure set to 0xFFFFFFFF; unused devices, have a time stamp with the high and low DWORDs set to 0x00000000. The dinput.h header file defines the DIAFTS_NEWDEVICELOW and DIAFTS_NEWDEVICEHIGH constants to identify new devices, and the DIAFTS_UNUSEDDEVICELOW and DIAFTS_UNUSEDDEVICEHIGH for devices previously enumerated, but never used by the application.

dwCRC
   CRC for this action-to-control map. This value is used internally by DirectInput to determine when a set of mappings should be persisted to disk.

tszActionMap
   Null-terminated string, of maximum length MAX_PATH, identifying the friendly name for this action map. This string appears in the drop-down list box within the default configuration UI.

DICOLORSET
   The DICOLORSET structure contains colors that DirectInput uses to draw the configuration user interface. All colors are RGBA values.

```
typedef struct __DICOLORSET{
    DWORD dwSize;
    D3DCOLOR cTextFore;
    D3DCOLOR cTextHighlight;
    D3DCOLOR cCalloutLine;
    D3DCOLOR cCalloutHighlight;
    D3DCOLOR cBorder;
    D3DCOLOR cControlFill;
    D3DCOLOR cHighlightFill;
    D3DCOLOR cAreaFill;
} DICOLORSET, *LPDICOLORSET;
```

Members dwsize
   Size of the structure, in bytes. This must be initialized before the structure can be used.

cTextFore
   Foreground text color.

cTextHighlight
   Foreground color for highlighted text.

cCalloutLine
   Color used to display callout lines within the UI.

cCalloutHighlight
   Color used to display callout lines within the UI.

cBorder
   Border color, used to display lines around UI elements (tabs, buttons, etc).

cControlFill
   Fill color for UI elements (tabs, buttons, etc). Text within UI elements is shown over this fill color.

cHighlightFill
   Fill color for highlighted UI elements (tabs, buttons, etc). Text within UI elements is shown over this fill color.

cAreaFill
   Fill color for areas outside UI elements.
   Setting all members (except dwSize) to 0 causes the default UI to display a default color scheme.
   Text background color is always transparent.

DICONFIGUREDEVICESPARAMS
   The DICONFIGUREDEVICESPARAMS structure carries parameters used by the IDirectInput8::ConfigureDevices method.

```
typdef struct __DICONFIGUREDEVICESPARAMS{
    DWORD            dwSize;
    DWORD            dwcUsers;
    LPTSTR           lptszUserNames;
    DWORD            dwcFormats;
    LPDIACTIONFORMAT lprgFormats;
```

```
         HWND            hwnd;
         DICOLORSET      dics;
         IUnknown FAR *  lpUnkDDSTarget;
} DICONFIGUREDEVICESPARAMS,
*LPDICONFIGUREDEVICESPARAMS;
``` dwSize

Size of this structure, in bytes.

dwcUsers

Count of user names in the array at lptszUserNames. If the pointer at lptszUserNames is NULL (to indicate that the default user name should be used), the value in this member is ignored. If this value exceeds the number of names actually in the array at lptszUserNames, the method fails, returning DIERR_INVALIDPARAMS.

lptszUserNames

Buffer containing a series of null-terminated strings, the last of which is designated by a double-null terminator.

If the application passes more names than the count indicates, only the names within the count are used. If an application specifies names that are different from the names currently assigned to devices, ownership is revoked for all devices, a default name is created for the mismatched name, and the UI shows "(No User)" for all devices.

dwcFormats

Count of structures in the array at lprgFormats.

lprgFormats

Pointer to an array of DIACTIONFORMAT structures that contains action mapping information for each genre the game uses, to be utilized by the control panel. On input, each action-to-control mapping provides the desired genre semantics and the human-readable strings to be displayed as callouts for those semantics, as mapped to the installed devices. The configuration UI displays the genres in its drop-down list in the order they appear in the array.

hwnd

Window handle for the top-level window of the calling application. The member is needed only for applications that run in windowed mode. It is otherwise ignored.

dics

A DICOLORSET structure that describes the color scheme to be applied to the configuration user interface.

lpUnkDDSTarget

Pointer to the IUnknown interface for a DirectDraw or Direct3D target surface object for the configuration user interface. The device image is alpha-blended over the background surface onto the target surface. The object referred to by this interface must support either IDirect3DSurface, or the following versions of the DirectDraw surface interface: IDirectDrawSurface4, IDirectDrawSurface7. If the application is not providing a callback funtion, this member is ignored.

DIDEVICEIMAGEINFO

The DIDEVICEIMAGEINFO structure carries information required to display a device image, or an overlay image with a callout. This structure is used by the IDirectInputDevice8::GetImageInfo method, as an array contained within a DIDEVICEIMAGEINFOHEADER structure.

```
typedef struct _DIDDEVICEIMAGEINFO{
         TCHAR tszImagePath[MAX_PATH];
         DWORD dwFlags;
         // These are valid if DIDIT_CONTROL
         is present in dwFlags.
         DWORD           dwViewlD;
         RECT            rcOverlay;
         DWORD           dwObjID;
         DWORD           dwcValidPoints;
         POINT           rgptCalloutLine[5];
         RECT            rcCalloutRect;
         DWORD           dwTextAlign;
} DIDEVICEIMAGEINFO, * LPDIDEVICEIMAGEINFO;
``` tszImagePath

Fully qualified path to the file that contains an image of the device. File format is given in dwFlags. If no image is available for the device, this member will be set to NULL. If so, the application is responsible for enumerating controls on the device and displaying a default listing of actions to device controls (similar to the method used by most applications before DirectX 8.0).

dwFlags

Flag that describes the intended use of the image. This member can be one of the following values.

DIDIFT_CONFIGURATION

The file is for use to display the current configuration of actions on the device.

Overlay image coordinates are given relative to the upper left corner of the configuration image.

DIDIFT_OVERLAY

The file (if provided) is an overlay for a particular control on the configuration image.

The dwOverlayOffset, rcOverlay, dwDevObjID, dicCalloutLine, dicCalloutRect, and dwTextAlign member are valid and contain data used to display the overlay and callout information for a single control on the device. If no file is provided (null path string), all other pertinent members are relevant except rcOverlay.

dwViewID

For device view images (DIDFT_CONFIGURATION), this is the ID of the device view. For device control overlays (DIDFT_CONTROL), this value refers to the device view (by ID) over which an image and callout information should be displayed.

Overlay

Rectangle, using coordinates relative to the top-left pixel of the device configuration image, in which the overlay image should be painted. This member is only valid if the DIDIFT_OVERLAY flag is present in dwFlags.

dwObjID

Control ID (as a combination of DIDFT_* flags and an instance value) to which an overlay image corresponds for this device. This member is only valid if the DIDIFT_OVERLAY flag is present in dwFlags. Applications use the DIDFT_GETINSTANCE and DIDFT_GETTYPE macros to decode this value to its constituent parts.

dwcValidPts

Number of points in the array at rgptCalloutLine which are valid. Points at index dwcValidPts should not be used.

rgptCalloutLine

Coordinates for the five points that describe a line with one to four segments that should be displayed as a callout to a game action string from a device control. This member is only valid if the DIDIFT_OVERLAY flag is present in dwFlags.

rcCalloutRect

Rectangle in which the game action string should be displayed. If the string cannot fit within the rectangle, the application is responsible for handling clipping. This member is only valid if the DIDIFT_OVERLAY flag is present in dwFlags.

dwTextAlign

One horizontal text-alignment flag, and one vertical text alignment flag. This member is only valid if the DIDIFT_OVERLAY flag is present in dwFlags.

DIDAL_LEFTALIGNED, DIDAL_CENTERED, DIDAL_RIGHTALIGNED

The text within the rectangle described by rcCalloutRect should be (respectively) left aligned, centered, or right aligned.

DIDAL_MIDDLE, DIDAL_TOPALIGNED, DIDAL_BOTTOMALIGNED

The text within the rectangle described by rcCalloutRect should be (respectively) top aligned, middle, or bottom aligned.

DIDEVICEIMAGEINFOHEADER

The DIDEVICEIMAGEINFOHEADER structure provides general information about device images, and provides a variable-length array of DIDEVICEIMAGE structures.

```
typedef struct _DIDEVICEIMAGEINFOHEADER{
    DWORD dwSize;
    DWORD dwSizeImageInfo;
    DWORD dwcViews;
    DWORD dwcButtons;
    DWORD dwcAxes;
    DWORD dwBufferSize;
    DWORD dwBufferUsed;
    DIDEVICEIMAGEINFO *lprgImageInfoArray;
} DIDEVICEIMAGEINFOHEADER,
 * LPDIDEVICEIMAGEINFOHEADER;
``` dwSize

Size of the DIDEVICEIMAGEINFOHEADER structure, in bytes. This must be initialized before the structure can be used.

dwSizeImageInfo

Size of the DIDEVICEIMAGEINFO structure, in bytes. This must be initialized before the structure can be used.

dwcViews

Count of views for this device. Each represents a unique view of the device.

dwcButtons

Count of buttons for the device.

dwcAxes

Count of axes for the device.

dwBufferSize

Input only. Size, in bytes, of the buffer at lprgImageInfo. When set to 0, the IDirectInputDevice8::GetImageInfo method returns the minimum buffer size required to hold information for all images in dwBufferUsed, producing no other output.

dwBufferUsed

Output only. Size, in bytes, of the memory used within the buffer at lprgImageDataArray. When dwBufferSize was set to zero, the IDirectInputDevice8::GetImageInfo method sets this member to the minimum size needed to hold information for all images.

lprgImageInfo

Buffer to be filled with an array of DIDEVICEIMAGE structures that describe all of the device images and views, overlay images, and callout-string coordinates.

The buffer at lprgImageInfo must be large enough to hold all required image information structures. Applications can query for the required size by calling the IDirectInputDevice8::GetImageInfo method with the dwBufferSize member set to 0. After the call, dwBufferUsed contains amount of memory, in bytes, that was modified.

The dwcButtons and dwcAxes members contain data that can be retrieved elsewhere within DirectInput, but that would require additional code. These are included for ease-of-use for the application developer.

Device Properties

DIPROP_USERNAME

The DIPROP_USERNAME property retrieves the user name for a user currently assigned to a device, as a DIPROPSTRING. This is a read-only property; user names are implicitly set by calling IDirectInputDevice8::SetActionMap.

DIPROP_KEYNAME

The DIPROP_KEYNAME property retrieves the localized key name for a keyboard key, as a DIPROPSTRING. This is a read-only property, key names cannot be changed.

DIPROP_SCANCODE

The DIPROP_SCANCODE property retrieves the scan code for a keyboard key, as a DIPROPDWORD. This is a read-only property.

DIPROP_VIDPID

The DIPROP_VIDPID property retrieves the vendor and product IDs from a device, as a DIPROPDWORD. The vendor ID is packed into the low word, and the product ID in high word. This is a read-only property.

DIPROP_UAPPDATA

The DIPROP_UAPPDATA property sets and retrieves the application-defined value associated with an in-game action, as a DIPROPDWORD. This is a read/write property.

Callback Functions

LPDICONFIGUREDEVICESCALLBACK

LPDICONFIGUREDEVICESCALLBACK is a definition for an application-defined callback function called by IDirectInput8::ConfigureDevices. DirectInput copies image data from the Input configuration UI to the application-provided DirectDraw surface. It is the application's responsibility to display the surface.

```
typedef void (FAR PASCAL *
LPDICONFIGUREDEVICESCALLBACK)(
    IUnknown FAR*, LPVOID
);
```

Parameters

Param1 (Type: IUnknown FAR*)

Address of an IUnknobwn interface for a DirectDraw or Direct3D surface object that contains the graphics for the configuration UI. This surface is originally passed to ConfigureDevices by the application.

Param2 (Type: LPVOID)

Address of application-defined data passed to IDirectInput8::ConfigureDevices.

Using this callback mechanism enables applications to add limited custom graphics and animations to the standard configuration UI. For complete control of device configuration, applications must use the Low-level UI API.

LPDIENUMDEVICESBYSEMANTICSCB

LPDIENUMDEVICESBYSEMANTICSCB is a definition for an application-defined callback function called by IDirectInput8::EnumDevicesBySemantics.

```
typedef BOOL (FAR PASCAL *
LPDIENUMDEVICEBYSEMANTICSCB)(
    LPCDIDEVICEINSTANCE, LPDIRECTINPUTDEVICE8,
    DWORD, DWORD, LPVOID
);
```

Param1 (Type: LPCDIDEVICEINSTANCE)

Address of a DIDEVICEINSTANCE structure that describes an instance of a device.

Param2 (Type: LPDIRECTINPUTDEVICE8)

Pointer to the IDirectInputDevice8 interface for the device object described by this structure.

Param3 (Type: DWORD)

Flags providing information about why the device is being enumerated. This can be a combination of any action-mapping flag, and one usage flag. At least one action-mapping flag will always be present.

Action Mapping Flags

DIEDBS_MAPPEDPRI1

The device is being enumerated because priority 1 actions can be mapped to the device.

DIEDBS_MAPPEDPRI2

The device is being enumerated because priority 2 actions can be mapped to the device.

Usage Flags

DIEDBS_RECENTDEVICE

The device is being enumerated because the commands described by the Action Mapping Flags were recently used.

DIEDBS_NEWDEVICE

The device is being enumerated because the device was installed recently (sometime after the last set of commands were applied to another device). Devices described by this flag have not been used with this game before.

Param4 (Type: DWORD)

Number of devices, after this one, remaining to be enumerated.

Param5 (Type: LPVOID)

Application-defined data given to IDirectInput8::EnumDevicesBySemantics, in the pAppData parameter.

Applications may want to detect newly installed devices (DIEBS_NEWDEVICE) and automatically notify the user that a new device was detected.

System devices (identified by the DIDEVTYPE_MOUSE or DIDEVTYPE_KEYBOARD flags in the dwDevType member of Param1) should probably always be polled for user input.

File Format for Action to Control Maps

This section describes a file format that gaming-device manufacturers can use in order to express a rich set of capabilities to DirectX 8 titles. The genre definitions are found in the appendix. The definitions describe the language that allows game developers to exploit the capabilities of an input device.

Our format is simply a variant of the .INI file format, which expresses game action to device control mappings. These files have the following format:

```
[SectionName1]
VariableNameA=Value1
VariableNameB=Value2
[SectionName]
VariableNameA=Value3
. . .
```

A device configuration file consists of the following parts:

1. List of supported devices and DirectX version
2. Device Identification
3. Device Images
4. Control type list
5. Control definitions
6. Control overlay images
7. Image (x, y) Offsets
8. Genre definitions
9. Game overrides The file format allows for the inclusion of additional capabilities with future DirectX revisions. (For example future versions may allow a per genre or game calibration).

List of Supported Devices and DirectX Version

A single configuration file may contain mappings for multiple devices. The keyword Devices lists devices for which control to action maps are supplied. DirectXVersion indicates the version of the DirectX Genre mappings tables that are used.

Device Identification

Vendor ID and Product ID can uniquely identify USB/HID devices. Legacy devices will be identified by the name of the device as found in the registry branch (HKLM/. . . /MediaProperties/Joystick/OEM). The device vendor can provide a path to the device image. The device image will be used to display current action to control mappings and provide an easy mechanism for users to configure the device.

Device Images

A device may require multiple images in order to view and configure its controls. The keyword ImageFileName.# is used to specify multiple views of the device. The # field should begin with 0 and sequentially increment till all device images have been declared.

Control Type List

Each device has a number of controls (axes, buttons, POV-s, etc). The keyword Controls lists the controls that a device supports. The device manufacturer can use any moniker to indicate identify a control. (Example: Xaxis, Thumb Button, etc).

Control Definitions

This part defines how particular control name maps to the actual hardware (Button1←[usage, usage page]). Each control on the device has its own section in the file. Values in the section describe how the control actually maps into the hardware. For most devices the HID Usage and UsagePage can uniquely identify a control. Additional keywords may be necessary for more sophisticated devices (TBD).

Non-USB devices use the DirectInput name to identify the control. For example: "Name=Button 1". Also, the DirectInput offset can be specified to identify the control, for example "Offset=12". (This is not to be confused with the image offsets.) The location of the control in the device image is indicated using offsets from the top-left of the image.

Image Offsets

Vendors should provide offsets from the top left corner of the image to the point where the game labels will be drawn. Up to 10 points can be specified. The Mapper will draw a line through the 10 points and render the action label provided by the game at the last point.

For example, "LineData.2=(1,1), (2,2), (3,3)". The "Align" field specifies how to align the string. Valid values for Align are: C, L, R, T, B, TL, TR, BL, BR. Lastly, the CallOutMax field specifies the maximum size of the callout rectangle. This field describes the top-left and bottom-right points of a rectangle such as, "CallOutMax=(11,22), (33, 44)".

Overlay Image

In order to highlight the control selected by a user, the Mapper will overlay this image over the Device Image, when the control is selected. OverlayFileName.# is used to specify filename. The field OverlayFileName.# refers to ImageFileName.#.

Genre Definitions

This is the part of the file that actually does the mapping between genres and semantics into the actual hardware. Each genre has its own section in the file. Each variable in the section represents the device control, and contains semantic value for that genre.

```
[DirectInput]
DirectXVersion=0x800
Devices=SidewinderPrecisionPro, SidewinderJolt, SidewinderLedZep
[SidewinderPrecisionPro]
VendorID=0x1
ProductID=0x4
Name=Sidewinder Precision Pro
; Moniker for controls
Controls=Xaxis,Yaxis,Twist,Slider,B1,B2,B3,B4,B5,B6,B7,B8,B9
; Devices can support multiple images
; Max size of image is (423, 309)
ImageFileName.0=Device0.png
ImageFileName.1=Device1.png
ImageFileName.2=Device2.png
;Control definitions*****************************************
[Xaxis]
;Usage=HID_USAGE_PAGE_GENERIC
Usage=0x1
;Usage Page = HID_USAGE_GENERIC_X
```

-continued

```
UsagePage=0x30
;Control name
Name=X Axis
;Dinput offset
Offset=22
;Line data in pixels from top left corner
LineData.1=(124,24),(140,24),(190,50)
; Overlay image: overlayed on top of ImageFile.x when control is selected
OverlayFileName.1=XSelect.png
Align.1=L
CallOutMax.1=(250,50),(60,60)
[Yaxis]
. . .
. . .
OverlayFileName.2=Yselect.png
;Genre definitions*****************************************
[SidewinderPrecision.Genre.1]
; Xaxis is steering
Xaxis=1
; Yaxis is accelerate
Yaxis=2
. . .
[MTM1.Macro1]
. . . TBD . . .
;Game *****************************************
[SidewinderPrecision.Application.{34C9990F-CBD7-11D2-AE0E-00C04FAEA83F}.Genre.1]
;Microsoft Monster Truck Madness v1, Genre Driving Sim
Macros=MTM1.Macro1,MTM1.Macro2
Xaxis=1
. . .
```

Example Semantic Mappings

Arcade—Platform Game

Genre: 34

DIAXIS_ARCADEP_MOVE:0x22008201 up/down

DIAXIS_ARCADEP_LATERAL:0x22010202 left/right

DIBUTTON_ARCADEP_JUMP:0x22000401 Jump

DIBUTTON_ARCADEP_FIRE:0x22000402 Use weapon

DIBUTTON_ARCADEP_CROUCH:0x22000403 Crouch

DIBUTTON_ARCADEP_SPECIAL:0x22000404 apply special move

DIBUTTON_ARCADEP_SELECT:0x22000405 select special move

DIBUTTON_ARCADEP_MENU:0x220004FE Pause—show menu options

Priority2 Commands ---

DIHATSWITCH_ARCADEP_VIEW:0x22004601 scroll view left/right/up/down

DIBUTTON_ARCADEP_DEVICE:0x220044FD Show input device and controls

Arcade-2D

Genre: 33

DIAXIS_ARCADES_MOVE:0x21008201 up/down

DIAXIS_ARCADES_LATERAL:0x21010202 left/right

DIBUTTON_ARCADES_THROW:0x21000401 throw object

DIBUTTON_ARCADES_CARRY:0x21000402 carry object

DIBUTTON_ARCADES_ATTACK:0x21000403 attack

DIBUTTON_ARCADES_SPECIAL:0x21000404 apply special move

DIBUTTON_ARCADES_SELECT:0x21000405 select special move

DIBUTTON_ARCADES_MENU:0x210004FE Pause—show menu options

Priority2 Commands ---

DIHATSWITCH_ARCADES_VIEW:0x21004601 scroll view left/right/up/down

DIBUTTON_ARCADES_DEVICE:0x210044FD Show input device and controls

CAD—2D Object Control

Genre: 35

DIAXIS_2DCONTROL_MOVE:0x23008201 move view up/down

DIAXIS_2DCONTROL_LATERAL:0x23010202 move view left/right

DIAXIS_2DCONTROL_ZOOM:0x23050203 in/out

DIBUTTON_2DCONTROL_SELECT:0x23000401 Select Object

DIBUTTON_2DCONTROL_SPECIAL1:0x23000402 do first special operation

DIBUTTON_2DCONTROL_SPECIAL:0x23000403 Select special operation

DIBUTTON_2DCONTROL_SPECIAL2:0x23000404 do second special operation

DIBUTTON_2DCONTROL_MENU:0x230004FE Pause—show menu options

Priority2 Commands ---

DIHATSWITCH_2DCONTROL_HATSWITCH: 0x23004601 Hat switch

DIAXIS_2DCONTROL_ROTATEZ:0x23024204 rotate view clockwise/counterclockwise

DIBUTTON_2DCONTROL_DISPLAY:0x23004405 shows next on-screen display options

DIBUTTON_2DCONTROL_DEVICE:0x230044FD Show input device and controls

CAD—3D Model Control

Genre: 38

DIAXIS_CADM_MOVE:0x26010201 move view up/down

DIAXIS_CADM_LATERAL:0x26008202 move view left/right

DIAXIS_CADM ZOOM:0x26050203 in/out

DIBUTTON_CADM_SELECT:0x26000401 Select Object

DIBUTTON_CADM_SPECIAL1:0x26000402 do first special operation

DIBUTTON_CADM_SPECIAL:0x26000403 Select special operation

DIBUTTON_CADM_SPECIAL2:0x26000404 do second special operation

DIBUTTON_CADM_MENU:0x260004FE Pause—show menu options

Priority2 Commands ---

DIHATSWITCH_CADM_HATSWITCH:0x26004601 Hat switch

DIAXIS_CADM_ROTATEX:0x26024204 rotate view forward or up/backward or down

DIAXIS_CADM_ROTATEY:0x2602C205 rotate view left/right

DIAXIS_CADM_ROTATEZ:0x26034206 rotate view clockwise/counterclockwise

DIBUTTON_CADM_DISPLAY:0x26004405 shows next on-screen display options

DIBUTTON_CADM_DEVICE:0x260044FD Show input device and controls

Having illustrated and described the principles of the illustrated embodiments, it will be apparent to those skilled in the art that the embodiments can be modified in arrangement and detail without departing from such principles.

For example, although specific implementations of the API are illustrated, the API can easily be modified by changing parameters associated with the API methods.

In view of the many possible embodiments, it will be recognized that the illustrated embodiments include only examples of the invention and should not be taken as a limitation on the scope of the invention. Rather, the invention is defined by the following claims. We therefore claim as the invention all such embodiments that come within the scope of these claims.

We claim:

1. A system for mapping an input device's controls to interact with an application, the system comprising:
   a user input device having a plurality of controls;
   an application that implements a set of actions comprising semantics of an application genre; and
   an action-control setup interface comprising a plurality of application genres;
   wherein upon an initial configuration of the application, the application calls the action-control setup interface with an input parameter comprising a data structure of the set of actions and the application genre, wherein the action-control setup interface associates the set of actions in the data structure to the plurality of controls of the user input device based on the of the application genre.

2. The system of claim 1, wherein the application can override the association created by action-control setup interface.

3. The system of claim 1, wherein an action in the set of actions comprises an application behavior resulting from a user operation of the controls on the user input device.

4. The system of claim 1, wherein the association further includes linking a control-semantic set to an action-semantic set by way of the genre, wherein the genre is a set of actions common to applications of a similar type.

5. The system of claim 1, wherein the action-control setup interface considers user preferences in creating the association.

6. The system of claim 1, wherein the action-control setup interface considers information provided from the device manufacturer in creating the association.

7. The system of claim 1, wherein the action-control setup considers similar applications that a user has configured to determine the association between an action and a given device control.

8. The system of claim 1, wherein the data structure comprises an action value, a predefined action semantic associated with the action value, and a label for the action.

9. The system of claim 1, wherein the action-control setup interface returns to the application an enumeration of input devices connected to the system that match the actions of the application.

10. The system of claim 1, wherein in response to an application call, the action-control setup interface examines all input devices connected to the system and invokes an application-defined callback function to enumerate the connected devices that match the application actions.

11. The system of claim 1, wherein the application receives its own application codes as incoming input device data.

12. The system of claim 1, wherein the action-control setup interface ranks input devices based on suitability of actions of the application.

13. The system of claim 1, further including an action-control setup call to display a default input device configuration.

14. The system of claim 13, further including automatically obtaining system information about input devices connected in the system, retrieving custom settings provided by the user, and rendering the user interface for input devices using system information and custom settings.

15. The system of claim 1 further including building an action map.

16. The system of claim 15 further including setting the action map after it is built.

17. The system of claim 16, wherein setting the action map includes mapping physical controller codes of the input device to physical application codes.

18. The system of claim 15 wherein building an action map includes obtaining information about user preferences and hardware manufacturer defaults to create the association between actions and device controls.

19. The system of claim 1 wherein the application is a game application.

20. The system of claim 1 wherein the input device includes a mouse, keyboard, game controller, force feedback device, or combinations thereof.

21. A method performed by a computing device, the method comprising:

upon initial configuration of an application that implements a set of actions comprising semantics of an application genre, receiving a call from the application at an action-control set-up interface, wherein input parameters of the call comprise a set of actions of the application and the application genre; and responsive to receiving the call at the action-control set-up interface, associating the set of actions to a plurality of controls of a user input device based upon semantics of the application genre.

22. The method of claim 21, wherein the action-control setup interface accesses information provided from the input device manufacturer in creating the association.

23. The method of claim 21, wherein logic implemented during association accesses a prior action-control association for another application, to determine a present association between an action and a device control.

24. The method of claim 21, wherein a member of the set of actions comprises an action value, a predefined action semantic associated with the action value, and a label for the action.

25. The method of claim 21, wherein the action-control setup interface returns to the application an enumeration of two or more input devices connected to the computing device that support the set of actions.

26. The method of claim 21, wherein the action-control setup interface examines input devices connected to the system and invokes an application-defined callback to enumerate connected devices with corresponding controls.

27. The method of claim 21, wherein logic responding to the call ranks input devices based on suitability of actions of the application.

28. One or more tangible computer readable media comprising computer-executable instructions that perform an action-control set-up when executed on a computing device, the computer-executable instructions comprising:

instructions for receiving an action-control set-up call from an application during initial configuration of the application, the call comprising a set of actions implemented by the application and a genre of the application; and instructions for associating the set of actions to plural controls of an input device based upon semantics of the genre.

29. The computer media of claim 28, wherein the executable instructions further comprise:

instructions for obtaining system information about a connected input device;

instructions for retrieving custom settings provided by a user; and instructions for rendering a graphical user interface using system information and custom settings.

30. The computer media of claim 28, wherein the executable instructions further comprise instructions for mapping physical controller codes of the input device to physical application codes.

* * * * *